(12) United States Patent
McCanney

(10) Patent No.: US 7,803,489 B2
(45) Date of Patent: Sep. 28, 2010

(54) HYDROGEN MOBILE POWER PLANT THAT EXTRACTS HYDROGEN FUEL FROM WATER

(75) Inventor: Neil R. McCanney, Tampa, FL (US)

(73) Assignee: Advanced Hydrogen Power Systems, Inc., Seminole, FL (US)

( * ) Notice: Subject to any disclaimer, the term of this patent is extended or adjusted under 35 U.S.C. 154(b) by 557 days.

(21) Appl. No.: 11/691,226

(22) Filed: Mar. 26, 2007

(65) Prior Publication Data

US 2008/0241614 A1 Oct. 2, 2008

(51) Int. Cl.
*H01M 8/04* (2006.01)
*H01M 8/06* (2006.01)
*B60L 11/18* (2006.01)

(52) U.S. Cl. .......................... 429/416; 429/9; 429/419; 429/442; 180/65.8

(58) Field of Classification Search .................. 429/9, 429/17, 19, 20, 22, 23, 24, 25; 423/685.2; 180/65.8
See application file for complete search history.

(56) References Cited

U.S. PATENT DOCUMENTS

| | | | |
|---|---|---|---|
| 3,971,454 A * | 7/1976 | Waterbury | 180/65.8 |
| 4,081,693 A * | 3/1978 | Stone | 429/19 X |
| 5,071,719 A | 12/1991 | Rostrup-Nielsen et al. | |
| 5,690,902 A | 11/1997 | Werth | |
| 5,840,270 A | 11/1998 | Werth | |
| 6,093,501 A | 7/2000 | Werth | |
| 6,468,499 B1 | 10/2002 | Balachandran et al. | |
| 6,689,259 B1 | 2/2004 | Klein | |
| 6,709,780 B2 | 3/2004 | Keskula et al. | |
| 6,716,400 B2 | 4/2004 | Brooks et al. | |
| 6,726,893 B2 | 4/2004 | Lee et al. | |
| 6,866,756 B2 | 3/2005 | Klein | |
| 7,049,015 B2 * | 5/2006 | Pratt et al. | 429/22 X |
| 2003/0219637 A1 | 11/2003 | Coors | |
| 2004/0013921 A1 | 1/2004 | Okada et al. | |
| 2004/0023085 A1 | 2/2004 | Lightner | |
| 2006/0057445 A1 | 3/2006 | Kabasawa | |

* cited by examiner

*Primary Examiner*—Stephen J. Kalafut
(74) *Attorney, Agent, or Firm*—Gerald E. Hespos; Michael J. Porco

(57) ABSTRACT

The apparatus contains a means to create superheated steam at a temperature of preferably 800° C. The superheated steam is delivered to a catalytic decomposition converter that contains ceramic membranes that function to decompose water $H_2O$ into its constituent elements of diatomic hydrogen and oxygen. In one embodiment, a cascade of catalytic cells, one set for hydrogen and one set for oxygen are arranged in a unique "Cascade and Recirculate" configuration that greatly improves the throughput of the catalytic process. Only enough hydrogen is produced and delivered to the fuel cell according to the real time demand. There is no hydrogen storage on board. An electrically heated boiler initializes the process, and thereafter the heat from the exothermic reaction of a high-temperature fuel cell, and a small hydrocarbon burner sustains the operational superheated steam temperature. By using the by-product heat of a high temperature fuel cell in conjunction with the efficient combustion of a small amount of conventional hydrocarbon fuel, a unique thermodynamic hybrid system is created. The electrical energy generated by the fuel cell is used to maintain the charged state of a traction battery. A plurality of pumps, valves, regulators and sensors under microprocessor control manage the processes.

23 Claims, 13 Drawing Sheets

HYDROGEN MOBILE POWER PLANT THAT EXTRACTS HYDROGEN FUEL FROM WATER

FIELD OF THE INVENTION

This invention relates to the field of producing electrical power by means of a fuel cell and more particularly to a system that contains multiple processing loops that use exothermic heat and regenerated water of the fuel cell for the production of hydrogen fuel using superheated steam to dissociate water, during the production of electrical power.

BACKGROUND OF THE INVENTION

The potential oil shortage, rising oil prices and the need to import vast amounts of oil from unstable foreign suppliers coupled with concerns over pollution are providing the impetus to develop a hydrogen based economy. There is a hydrogen initiative research program in the United States and in other western industrial nations. The goal of these programs is to develop technologies needed for hydrogen fueled vehicles.

Existing problems include: a practical way to produce large, industrial quantities of hydrogen, the creation of a commercial distribution system, and methods to pump and store large amounts of hydrogen on a vehicle. At present, the U.S. Department of Energy estimates that 110 tons of hydrogen per day would be required to replace the consumption of 200 million gallons of gasoline consumed per day. At this time, the storage tanks required are larger than the vehicle, even at immense pressures of 10,000 PSI or greater.

There are no energy efficient methods to industrially produce the hydrogen required. Methods to produce, distribute, pump or store enough hydrogen for fuel cell powered vehicles to travel a minimum of 300 miles before refueling do not exist.

Tens of billions of dollars have been spent worldwide to solve these problems. Some experts estimate that the realization of fuel cell powered electric vehicles, and the infrastructure to refuel them, may be 30 years and 30 billion dollars or more in the future.

The teachings of the present invention restructures the problem and provides a solution to the problems of production, distribution and storage of hydrogen required for fuel cell powered vehicles, and negates the need for a new fueling infrastructure.

DESCRIPTION OF PRIOR ART

Prior art in the development of a means to produce hydrogen is abundant. However, prior art efforts that facilitates economic production, distribution, storage and widespread use of hydrogen, as fuel, are problematic.

The industrial production of hydrogen has been proposed through electrolysis of water, using power from the existing power grid. It has also been suggested that hydrogen be produced by electrolysis, powered by nuclear power stations. Clearly, the present power grid, now operating at near full capacity, would be inadequate to the task without the costly construction of additional power generation facilities that, once on line, would require energy resources to convert water to hydrogen and oxygen, through electrolysis.

Further, the construction of additional power stations and expansion of the power distribution grid, possibly including construction of a number of nuclear power stations to augment the grid or dedicate to the electrolysis process, wherein the energy required is greater than the energy contained in the hydrogen produced, appears environmentally and economically unlikely in the foreseeable future.

One example of prior art regarding production is a recent proposal supported by the U.S. Department of Energy and headed by Professor Alan Weimer at the University of Colorado, that involves oxidizing zinc with high temperature steam. As the zinc oxidizes, using the oxygen in $H_2O$, hydrogen is thereby liberated. The zinc oxide would then be recycled at 1,600° C. and reused. The heat for this process on an industrial scale would be provided by solar energy. The solar energy would be collected by 12,000 massive mirrors, each measuring 150 square meters. The mirrors would be focused on 12 towers 800 feet tall, spread over an area of 1,200 acres. This process would likely require the development of high temperature materials for use in the solar-thermal reactor.

While this proposal offers a means to produce hydrogen, using high temperature steam, it leaves several issues. If such a facility were constructed, the problems of transportation, distribution, retail fueling and storage of hydrogen on board individual vehicles would still remain. This system of hydrogen production would require the development of a new, and very complex vehicle-fueling infrastructure.

The present invention does not require central or regionally located hydrogen production facilities. The present invention does not require the development of a new fueling infrastructure or a retail system for hydrogen distribution and fueling. The present invention demonstrates a system that produces the needed hydrogen on board the vehicle. The present invention does not require the storage of hydrogen gas in any form on the vehicle, as it is produced on board, as required.

Proposals by some automotive manufacturers to create on board hydrogen storage systems, wherein the hydrogen is liquefied and stored at extremely high pressures of ten thousand PSI or more, are neither economical nor practical. It should be noted that half of the energy contained in the hydrogen is used to pressurize and condense it, and liquid hydrogen must be kept cold to avoid "boil off", lest the pressure in the tank increase beyond control, if it is allowed to warm up. NASA, for example, allows liquid hydrogen storage tanks to outgas. This cannot be allowed in a personal vehicle due to the extreme flammability of hydrogen. Furthermore, liquid hydrogen is simply too dangerous to distribute at the retail level. It is unlikely that this concept would ever be used to fuel the hydrogen-powered cars of tomorrow.

Storage of hydrogen, in the form of metal hydrides, on vehicles has been considered. Metals like Palladium absorb hydrogen much like a sponge. Hydrogen is safe in this form and can be liberated by heating the metal. However, the storage to weight ratio is prohibitive. It would require 25 pounds of metal to store 1 pound of hydrogen.

A more sophisticated form of hydrogen storage involves the use of hydrogen rich compounds called chemical hydrides, such as Sodium Borohydride, $NaBH_4$. This method makes the stored hydrogen safer, and a hydrogen on demand system could be developed based on the catalytic chemical liberation of the hydrogen, leaving a residue borate of $NaBO_2$. However, there are economic and other issues surrounding this method of on board hydrogen storage.

Hydrogen Borohydride does not occur naturally and must be created. This compound is presently three times the cost of gasoline and contains much less energy than gasoline. The relatively low amount of energy contained in this compound would require the acquisition and storage of large amounts of Sodium Borohydride on the vehicle. As the hydrogen is reclaimed from this compound the residue borate would require removal from the vehicle in a refueling cycle.

The present invention extracts hydrogen from, the hydrogen-containing compound water. This compound occurs naturally, does not have to be chemically manufactured, and is already widely distributed. Furthermore, the fuel cell system, by its very nature, electrochemically regenerates water as the fuel cell delivers electrical power. The present invention captures and reuses the regenerated water. Water is easy and safe to store. No residue is created when the hydrogen and oxygen are separated from water and both of these diatomic elements are used by the fuel cell in the same relative quantities derived by the dissociation of water that takes place in the apparatus that is the subject of the present invention. The present invention, therefore, discloses a unique, practical, and useful system.

In a system by Gamzon and Yogev, International Pat. WO/2003/078540, "A Closed Loop Energy System for Power Generation and Transportation based on Metal Fuel and Condensed Phase Oxidizer", reactions with alkali metals and water are used to produce hydrogen. The condensed phase oxidant, hydrogen peroxide, $H_2O_2$ is used in this process that runs at a temperature of 1,000° C. This System can be used in a vehicle, wherein the hydrogen and the superheated steam are both fed into a modified internal combustion engine. This system is the work of Engineuity Research and Development LTD.

Like other systems that propose using chemically produced hydrogen compounds that do not occur naturally, someone must manufacture and distribute them. The Gamzon and Yogev system does not use hydrogen in a fuel cell but rather injects the hydrogen generated into a modified internal combustion engine. Maintaining the internal combustion engine, which is less than 30% efficient, loses the advantages of fuel cell powered electric vehicles.

It is believed that the alkaline metal in the Gamzon and Yogev system is supplied to the reaction process by feeding said metal in the form of a wire into the reaction chamber. As the wire is oxidized, hydrogen is liberated and the oxidized wire is then collected on a take up reel. When all of the wire is used, the spent reel of wire would be replaced by a new spool of wire at some kind of distribution center. It is not clear how the metal wire feed system would work. The surface area contained in a small wire is insufficient to generate large amounts of hydrogen in real time given any practical feed rate. By contrast, the surface area of a larger wire would allow a greater reaction rate and produce more hydrogen per minute, however, less of the larger wire would be available on a given spool size. It is not known how one would be able to predict how much wire is left before having to refuel. This system would require the development of new distribution infrastructures to sell and exchange alkali metal wire.

The present invention offers many advantages, through the use of a fuel cell powered electric vehicle, over the Gamzon and Yogev work. The present invention does not require the use of a chemically manufactured hydrogen compound. The present invention bears no similarity to the Gamzon and Yogev apparatus. The advantages of the present invention will be apparent to anyone skilled in the art upon comparison of the two systems.

In U.S. Pat. Nos. 6,093,501, 5,840,270, 5,830,426, and 5,690,902, all to Werth, hydrogen is generated by passing superheated steam over ground iron in the presence of a catalyst (Potassium Hydroxide).

Each of the Werth patents involves the grinding of iron into small particles. The general idea is to cause the freshly ground iron to oxidize using the oxygen present in high temperature steam, in the presence of a catalyst, thereby liberating, free diatomic hydrogen that can be used as a fuel.

Examination of this process indicates that it would require hundreds of pounds of iron to liberate the two or three hundred liters of hydrogen per minute (minimum) that is required to power an electric vehicle. There is currently no fueling infrastructure for the procurement of the needed pure iron pellets that must be loaded into the, energy consuming, iron pellet grinder on the vehicle. Iron in its pure form is not readily available. It is expensive and heavy.

The works of Werth also require the removal of iron oxide (rust) after the completion of the oxidizing and hydrogen liberation process. This assumes that someone would collect this residue and, at some facility, the iron oxide would be reduced to pure iron and reformed into again usable iron pellets. This would be an expensive process and require construction of such facilities, as well as a distribution system and the development of protective packaging to prevent premature oxidation of the iron pellets.

The present invention provides a solution to the problems of production, distribution and storage of hydrogen and negates the need for a new fueling infrastructure. For this reason, the present invention offers new and unique promise for fuel cell electric vehicles in the very near term. The present invention teaches means and methods for achieving a significant and useful supply of electrical energy. The utility of the present invention is apparent.

OBJECTS OF THE INVENTION

The primary object of the invention is to provide an apparatus that performs as a 50 kW mobile fuel cell power plant, which uses a primary hydrogen fuel that is extracted from water.

A second primary object of the invention is to render the requirement to create a hydrogen fueling infrastructure unnecessary and thereby rendering fuel cell powered electric vehicles more practical in the short term.

A main object of the invention is to negate the need to store diatomic hydrogen gas, $H_2$ on a fuel cell powered electric vehicle. A means is provided to generate $H_2$ on board the vehicle, as needed, "on demand" in real time is disclosed.

Another object of the invention is to provide a method and means to recapture the "unreacted hydrogen" in fuel cell systems or applications, and thereby improve their overall fuel efficiency.

It is an object of the invention to maintain an automatically fully charged traction battery on an electrically powered vehicle, without the use of a hybrid internal combustion engine. This will greatly extend the range and miles per gallon of such vehicles, to a new and improved value of a range of from a minimum of 300 miles per gallon to a maximum of 500 miles per gallon.

It is a further object of the invention to provide a means and method to effect micro-processor control sequences to effect "cold start", "run" and "shut down" operational modes.

It is still a further object of the invention to provide a means and method to achieve microprocessor control sequences to effect an "auto charging" mode of operation even when the vehicle is parked and unattended.

It is also an object of the invention to provide a means, method and control sequences that will protect the fuel cell and decomposition subsystems from catastrophic freezing in ambient temperatures below 0° C. A way to protect the water storage tank from catastrophic failure at temperatures below 0° C. is described.

It is also an object of the invention to provide a means, method, and apparatus that performs as a 50 kW stationary fuel cell power plant, which uses a primary hydrogen fuel that is extracted from water.

SUMMARY OF THE INVENTION

In one embodiment, a fuel cell system for producing electrical energy is disclosed including a boiler to create superheated steam. The superheated steam is delivered through an output modulation valve to at least one hydrogen catalytic decomposition converter that contains at least one ambipolar cermet membrane that functions to decompose water $H_2O$, and generates diatomic hydrogen gas.

The fuel cell uses the hydrogen, so generated, and oxygen from the atmosphere to produce electrical power. The fuel cell also produces a significant amount of heat and regenerated water, which is released from the fuel cell as high temperature steam. The regenerated water as steam is captured and returned to the boiler.

The thermal energy of the steam and other reaction heat is directed to the boiler and used to continue the hydrogen production by thermal dissociation within the catalytic cell or cells containing one or more hydrogen selective membranes. A small amount of heat created by the combustion of a small amount of any number of fuels in Table 10 augments the thermal processes. A microprocessor is provided to control the system.

In another embodiment, a fuel cell system for producing electrical energy is disclosed including a boiler to create superheated steam. The superheated steam is delivered through an output modulation valve to at least one hydrogen catalytic decomposition converter that contains at least one ambipolar cermet membrane chemically suited to capture hydrogen and the steam outflow from the hydrogen catalytic cell or cells is then directed into at least one other oxygen converter, or converters.

The oxygen converter(s) contains at least one ambipolar cermet membrane chemically suited to capture oxygen. These thermal catalytic cells, each with their unique ambipolar cermet membrane(s) function to decompose water $H_2O$ into its constituent elements of diatomic hydrogen and oxygen gas.

In this process a cascade of catalytic cells, one set for hydrogen and one set for oxygen, are arranged in a unique "Cascade and Recirculate" configuration that greatly improves the throughput of the catalytic process.

A pump circulates superheated steam through the catalytic cells, each in turn, in multiple passes. As hydrogen is liberated by one set of cells, the free oxygen left commingled in the steam, is next captured by the second set of catalytic cells selective to oxygen capture and generation. When the catalytic cells configured to liberate oxygen leave behind unreacted steam, free hydrogen is commingled with the steam.

This mixture is reheated, after passing back through the boiler, and then fed back to the first set of hydrogen selective cells where the additional free hydrogen is captured and more steam is dissociated during another pass. The process is repeated as the circulation continues.

The fuel cell uses the hydrogen, so generated in at least one catalytic cell or cells, and oxygen generated by at least one catalytic cell or cells to produce electrical power. The fuel cell also produces a significant amount of heat and regenerated water, which is released from the fuel cell as high temperature steam. The regenerated water as steam is captured and returned to the boiler.

The thermal energy of the steam and other reaction heat is directed to the boiler and used to continue the hydrogen and oxygen production by thermal dissociation within the catalytic cell or cells. A small amount of heat created by the combustion of a small amount of secondary fuel augments the thermal processes. A microprocessor is provided to control the system.

In still another embodiment, a fuel cell system for producing electrical energy is disclosed including a device for producing superheated steam, a device for producing hydrogen gas in real-time and a device for producing oxygen gas in real-time. The device for producing hydrogen gas has at least one ceramic membrane for converting superheated steam into hydrogen gas and the device for producing oxygen gas has at least one ceramic membrane for converting superheated steam into oxygen gas. A fuel cell converts the hydrogen gas and the oxygen gas into electrical power. The fuel cell also produces a significant amount of heat and regenerated water, which is released from the fuel cell as high temperature steam. The regenerated water as steam is captured and returned to the device producing steam.

The thermal energy of the steam and other reaction heat is directed back into the process and used to continue the hydrogen and oxygen production by thermal dissociation within the gas generating device(s). A small amount of heat created by the combustion of a small amount of hydrocarbon fuel augments the thermal processes.

If the apparatus is used to power an electric vehicle, the electrical energy generated by the fuel cell is used to maintain the charged state of a traction battery. If the electrical energy generated by the fuel cell is used in a stationary application, the electrical energy is sent to a suitable inverter and coupled to an AC load or power grid.

When the demand for electrical energy is cut off, an output modulation valve shuts off the supply of superheated steam to the catalytic converter and the production of hydrogen ceases. If there is no demand for electrical power, there is no generation of hydrogen or oxygen gas.

A plurality of pumps, valves, regulators and sensors under microprocessor control manage the processes. As many as seven operational modes are programmed within the microprocessor for use when the apparatus is used to power an electric vehicle. Other operational modes are used to provide control for stationary power generators. Various means and methods are employed to prevent catastrophic failure of the elements of the system if the water, used as fuel, should freeze.

BRIEF DESCRIPTION OF THE DRAWINGS

The invention can be best understood by those having ordinary skill in the art by reference to the following detailed description when considered in conjunction with the accompanying drawings in which.

BRIEF DESCRIPTION OF THE TABLES

Figure 1:
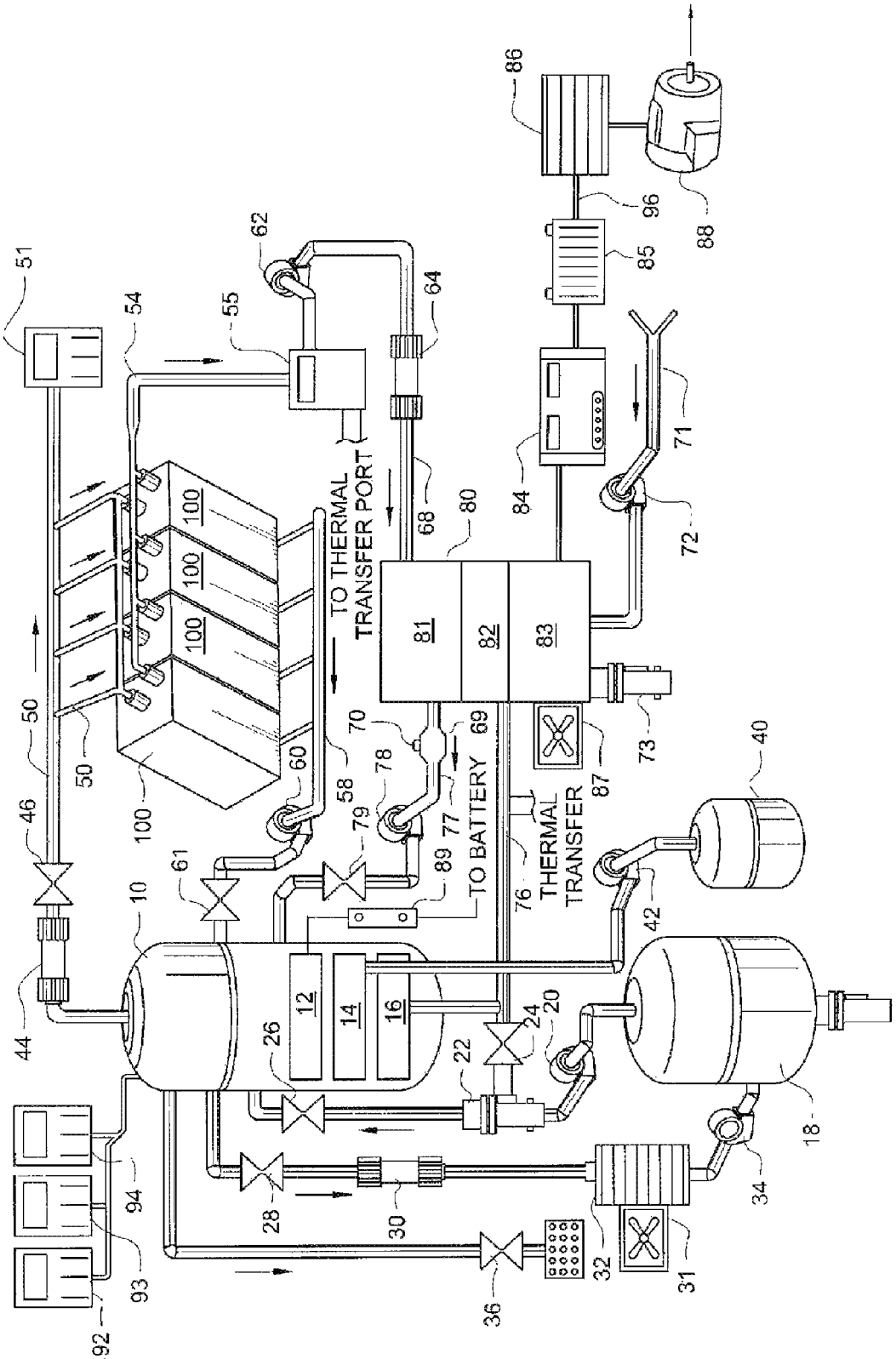
FIG. 1 is a system diagram of the first and preferred embodiment of the invention that captures $H_2$ from onboard water $H_2O$ and utilizes $O_2$ from atmospheric air.

Some equations are required to describe the apparatus. The equations help define the purpose, function, and scope of the apparatus. The equations and mathematics described herein help serve to prove the validity of the design.

Volumetric based rates are subject to variation in temperature and pressure conditions. Molar based rates define the amount of substance and are not subject to variation in temperature and pressure conditions.

| | |
|---|---|
| Table 1: | Vehicle Energy Requirement Based on the 2005 Toyota Prius |
| Table 2: | Volumetric Pure Oxygen Consumption Rate |
| Table 3: | Molar Pure Oxygen Consumption Rate |
| Table 4: | System Temperature, Pressure and Volume Constraints |
| Table 5: | Molar Hydrogen Fuel Consumption Rate |
| Table 6: | Volumetric Hydrogen Fuel Consumption Rate |
| Table 7: | Molar Oxygen in Air Consumption Rate |
| Table 8: | Optimization of Load Parameters for Maximum Electrical Power Transfer |
| Table 9: | Solid Oxide Fuel Cell Chemical Reaction Equations and the Fuel Cell Water Production Rate |
| Table 10 | Properties of Some Common Fuels |

GENERAL DESCRIPTION OF THE INVENTION

A general overview of the present invention is presented and followed by a description of the concept of a thermodynamic hybrid and a discussion of thermodynamics of the present invention. A discussion of the decomposition of water and a brief summary of thermodynamics as it relates to the present invention is presented. An overview of the process of hydrogen and oxygen production and a detailed description of the presently first and preferred and second and most preferred embodiments of the invention, examples of which are illustrated in the accompanying drawings are described. Throughout the detailed description, the same reference numerals refer to the same elements in all figures.

The apparatus of the present invention contains a boiler used to generate superheated steam and a catalytic converter that uses superheated steam to generate hydrogen and oxygen. A high temperature fuel cell uses hydrogen and oxygen gases to produce electrical power that may be used to power an electric vehicle. Heat and high temperature regenerated water from the fuel cell are used in conjunction with a small ancillary combustion burner to provide the required heat for the decomposition of water utilizing cermet membranes to generate hydrogen fuel and oxygen for the fuel cell.

Thermodynamic Hybrid

By using the by-product heat of a high temperature fuel cell in conjunction with the efficient combustion of a small amount of conventional hydrocarbon fuel, a unique thermodynamic hybrid system is created. This new thermodynamic hybrid system delivers a performance of 300 miles per gallon to 500 miles per gallon. A microprocessor is provided to control the system.

The present invention utilizes superheated steam to decompose water $H_2O$ into its constituent elements of diatomic hydrogen and oxygen gases in quantities needed on demand in real time.

The apparatus of the present invention does not use stored hydrogen gas in vapor or liquid form. Only enough hydrogen is produced and delivered to the fuel cell according to the real-time demand required for a requisite electrical power level. The production of hydrogen gas, as it is used, negates the need to store hydrogen.

The present invention uses superheated steam and ambipolar cermet membranes to produce hydrogen and in some embodiments, to produce both hydrogen and oxygen by decomposition of water using cermet membranes. The ambipolar cermet membranes are described in detail in U.S. Pat. No. 6,726,893 to Lee, et al. titled "Hydrogen Production by High-Temperature Water Splitting Using Electron-Conducting Membranes," which is hereby incorporated by reference.

Another catalytic membrane for the production of hydrogen by thermal decomposition using ambipolar cermet membranes is described in detail in U.S. Pat. No. 6,468,499 to Balachandran, et al, titled, "Method of Generating Hydrogen by Catalytic Decomposition of Water," which is also hereby incorporated by reference.

The present invention incorporates the described hydrogen selective and oxygen selective membranes in new and unique catalytic cells. The catalytic cells containing the membranes are part of a new and unique "cascading and recirculating" system designed to produce the required amount of hydrogen or hydrogen and oxygen gases. The diatomic gases are utilized within a fuel cell to generate electrical power.

Throughout this description, the steam temperature, steam pressures, gas production rates, membrane sizes, steam mass flow rates, and system volume etc. are examples of one set of working parameters based in part upon the described ceramic membrane's properties and surface area.

In alternate embodiments, other catalytic membrane materials or other catalysts may be incorporated. Other membranes may or may not require different steam temperatures, steam pressures, gas production rates, membrane sizes, membrane surface area, steam mass flow rates, and system volume, etc. and as such do not depart from the scope of the present invention. For example, an alternate membrane may require a different steam temperature and, a greater surface area to produce an equivalent, required volume flow rate of hydrogen or hydrogen and oxygen.

Thermodynamics

A greater understanding of the concept of the new and unique thermodynamic hybrid concept, presented in the present invention, is possible after a review of the thermodynamic model presented herein. Other thermodynamic models might prove useful if they relate to other dissociation catalytic materials or other fuel cells with different thermal properties. The example presented demonstrates the concept of interrelated heat transfers and the cascade of differential exothermic and endothermic processes coupled with the addition of ancillary thermal energy, provided by the combustion of gasoline, diesel, or any fuel listed in Table 10 Such concepts support and make possible the hydrogen fuel cell system, in the present invention, that contributes to the generation of its own fuel.

It is an object of the apparatus, of this invention, to collect and use as much of the heat energy developed by the high temperature fuel cell as possible. Further, it is an object to use this energy in the assemblies that perform the catalytic dissociation production of hydrogen and oxygen. That is, to use as much by-product heat energy of the fuel cell in the production of new fuel as possible. A fan for cooling the high temperature fuel cell is provided only to avoid catastrophic thermal overload of the fuel cell in the event of abnormal system operation.

Thermal energy is contained within the structures of the boiler, catalytic converter cells, and fuel cell by the application of super high temperature insulation. A spun ceramic insulation composed of $Al_2O_3$ and $SiO_2$ fibers called "Fiberfrax Durablanket S" is one example of an insulation suitable for this purpose. This insulation also protects personnel from the very high operational temperatures of the apparatus.

Fuel cells generate energy by chemically combining free diatomic hydrogen, $H_2$ and free diatomic oxygen, $O_2$. The operative equation, $H_2 + \frac{1}{2}O_2 \rightarrow H_2O + heat + 2\ e^-$, is an exothermic reaction that releases energy as the reactants combine. A more complete chemical reaction equation is depicted in Table 9. This energy is the heat of formation. Electrons are exchanged in the reaction flow through an external circuit as an electrical current and dissipate in a load as electrical power. Fuel cells generate both thermal energy and electrical energy. The sum of the two is the total energy produced. Concurrently with energy production fuel cells generate water and high temperature fuel cells generate water as steam.

The theoretical maximum of the heat of formation is known to be 285.8 kJ/mol (the high heat value, HHV). As depicted by the above equation, 1 mol of hydrogen, when reacted with ½ mol of oxygen, will yield 1 mol of water and 241.6 kJ of net energy as electrical energy and heat. One mole of water weighs 18 grams and has a volume of 18 ml. In the preferred, and most preferred embodiments 24.4 moles of water with a volume of 440 ml are processed.

Water is Decomposed

The present invention generates hydrogen and oxygen that is consumed internally. Free $H_2$ and free $O_2$ can be produced from water by at least two processes. Water can be split using electrolysis through the utilization of two submerged electrodes and supplying thereto 237 kJ of electrical energy per mole of water where the electrical energy is supplied from an external source.

The energy for dissociation (decomposition) into atomic H and atomic O is 135 kcal/mol. (about 5.9 eV) When 2H and 2O combine to form diatomic $H_2$ gas and $O_2$ gas, the recombining reaction creates 78.4 kcal/mol. The net energy is therefore 135-78.4 kcal/mol, which is equal to 56.6 kcal/mol. By a units conversion where, 1 kcal=4.187 kJ, 56.6 kcal/mol then becomes 237 kJ/mol. This reaction is endothermic, and dissociation requires energy from an external source.

An additional 48.8 kJ of thermal energy is absorbed from the warmer environment to maintain a constant temperature of the process as the evolution of hydrogen and oxygen bubbles slightly cool the process. The total energy is, therefore, a total of 285.8 kJ/mol. This reaction is endothermic, and energy must be provided from an external source for the electrolytic, dissociation process to proceed.

Water can also be dissociated by purely thermal means, when non-catalyzed, by raising the temperature of a mol of water to 3500 K. The energy required is generally agreed to be 285.8 kJ/mol. Additional energy is required during non-catalyzed thermalysis to minimize recombination. The determination of the exact temperature required for dissociation is difficult to measure because recombination occurs to some degree along with dissociation.

The energy for dissociation by thermal means, in the process used within the current invention, is supplied by the energy contained in the thermal content of the superheated steam. Dissociation by catalytic thermal processes also takes place at a very high, but significantly reduced, temperature. The required new temperature is an altered, threshold, dissociation temperature.

Water in the form of superheated steam at 800° C. can be dissociated by non-galvanic, thermal means in the presence of a very specific, ambipolar, cermet catalyst. The thermal energy can be supplied solely by virtue of the energy content of the steam. The catalyzed temperature of activation falls from 3500 K (or above) to a much lower value of 1073 K (800° C.). This is similar to catalytic thermal cracking, which is common in the chemical processing of petroleum, except in this case the raw compound is water.

The catalytic reaction step-down ratio is 0.3466. This is the ratio of the available (usable) heat content of superheated steam at a temperature of 1073 K to the available (usable) heat content of superheated steam at 3500 K.

The heat content H of superheated steam at 1073 K (800° C.) is 1,785 BTUs/lb. and $4.152 \cdot 10^3$ kJ/kg. The heat content H of superheated steam at 3,500 K (3,237° C.) is 5,150 BTUs/lb. and $11.98 \cdot 10^3$ kJ/kg.

The heat content H (enthalpy) of superheated steam can be computed using the following truncated polynomial. The temperature must be entered in degrees Kelvin (K). The answer is presented in BTUs/lb. A pound of steam is created from a pint of water.

$$H = 777.6 + 0.633T + 1.625 \times 10^{-4}T^2 + 47.364\ (\text{Log}T)$$

BTUs/lb. can be converted to $kJ\ kg^{-1}$ by multiplying by 2.326.

Therefore, the activation energy depression ratio can be applied to the known dissociation activation energy threshold of 285.8 kJ/mol, to find the new catalyzed dissociation activation energy threshold.

Accordingly the non-catalyzed dissociation energy of 285.8 kJ/mol·0.3466=99.06 kJ $mol^{-1}$. This is the new, catalyzed dissociation energy threshold. The new, depressed value of 99.06 kJ $mol^{-1}$ is a result of the catalytic process and the effect of the cermet membranes.

If the process of recombination that generates heat of formation is cascaded with a process of catalyzed dissociation, only a small deficit of energy is required from an external source.

Summary of Theromydnamics

The topic of thermodynamics addressed within this work serves to demonstrate how much energy must be added to a system that disposes two serial processes. The first process that requires energy is endothermic, and is the catalytic dissociation of water to generate hydrogen and oxygen. The second of two processes involves a fuel cell that recombines said hydrogen and oxygen to once again create water, an exothermic reaction that generates energy.

The teachings of the present invention include thermodynamic models and equations that allow alternate embodiments to be tailored to other various catalytic devices or membranes.

Figure 2:
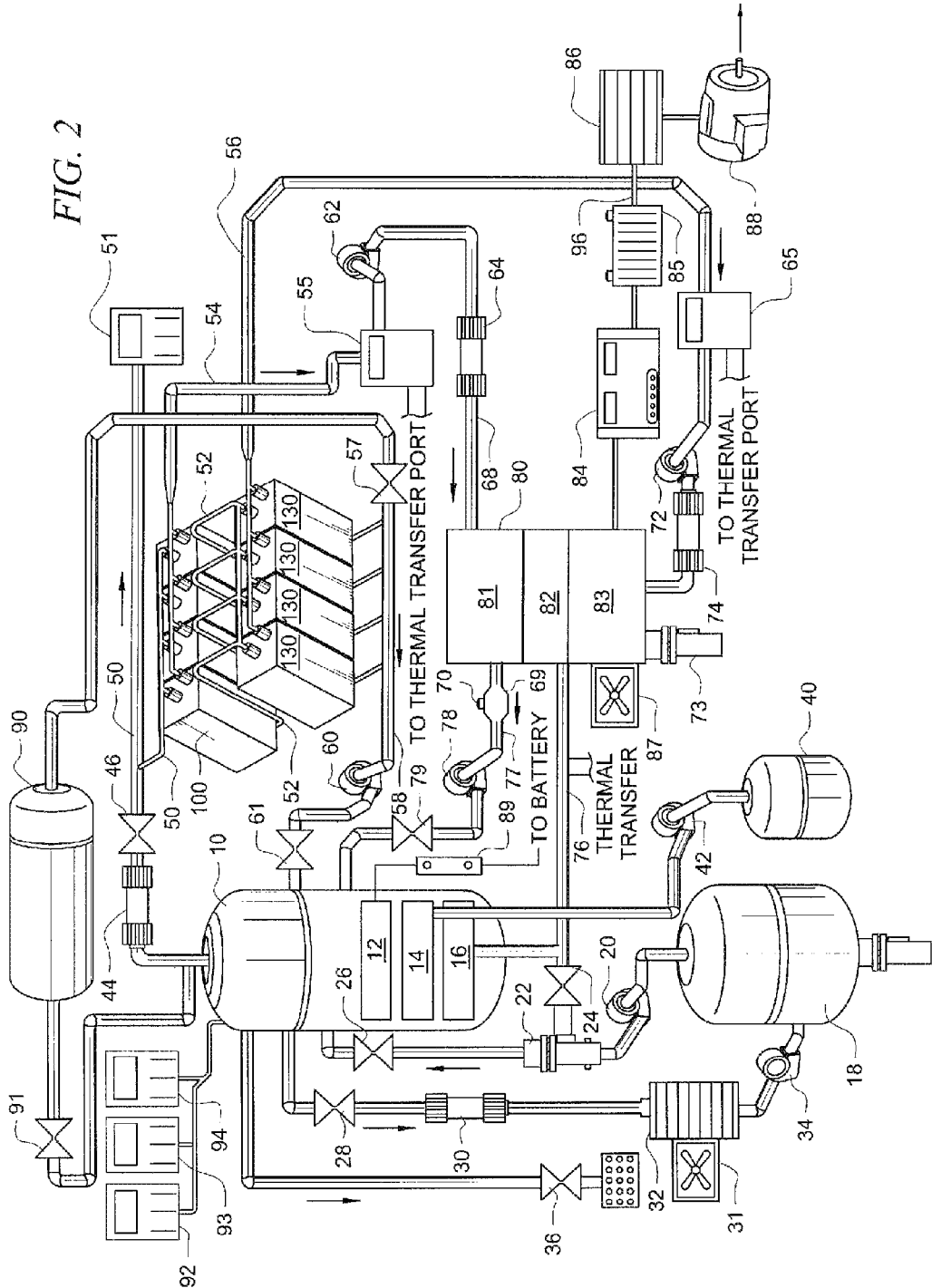
FIG. 2 is a system diagram of the second and most preferred embodiment of the invention that extracts both $H_2$ and $O_2$ from onboard water $H_2O$.

As shown in FIGS. 1 and 2, the preferred embodiments, superheated steam is generated in an electrically heated boiler 10 at a temperature of approximately 800° C. and at a pressure of 100 to 300 PSIG. The superheated steam is delivered from the boiler 10, through a pressure regulator 44 and through an output modulation valve 46 to an array of catalytic decomposition converters 100 and 130 that contain ambipolar cermet membranes. The membranes function to decompose water ($H_2O$) into constituent gases of hydrogen and oxygen.

The gases are used by a fuel cell 80 to generate electrical power. The system of the present invention uses the electrical energy generated by the fuel cell 80 to maintain the charged state of a battery 85. In a vehicle application, the electric energy from the battery 85 is used to power a traction motor 88. Speed control of the traction motor 88 is well known in the art and is intentionally left out for clarity.

If the electrical energy generated by the fuel cell is used in a stationary application, the electrical power is sent to a suitable inverter for conversion to AC power and coupled to a conventional load or power grid.

The regenerated water and heat from the exothermic reaction concurrently generated by a high-temperature fuel cell 80 are processed in multiple loops and used to generate more hydrogen and oxygen from water. A small amount of conventional fuel is used in a small combustion burner 14 to maintain an operational temperature.

In the system of the present invention only enough hydrogen is produced and delivered to the fuel cell according to the real-time demand. When the demand for electrical energy abates, the output modulation valve 46 shuts off the supply of superheated steam to the catalytic converter 100 or catalytic converter 100 and catalytic converter 130 and the production of hydrogen or hydrogen and oxygen ceases.

Production of Hydrogen and Oxygen

In FIG. 1, the catalytic cells 100 contain ambipolar cermet membranes chemically suited for the selection and production of hydrogen.

In FIG. 2, a cascade of catalytic cells 100 and 130, one set for hydrogen 100 and one set for oxygen 130 is shown. The catalytic cells 100 and 130 that contain ambipolar cermet membranes functioning to decompose water ($H_2O$) into its constituent elements of diatomic hydrogen and oxygen are arranged in a "Cascade and Recirculate" configuration that greatly improves the throughput of the catalytic process. The circulation of the superheated steam is the system equivalent of stirring a chemical reaction and increases catalytic contact. When hydrogen specific catalytic cells and oxygen specific catalytic cells are present, both hydrogen and oxygen gases are produced.

In this process the catalytic cells for the generation of hydrogen 100 and the catalytic cells for the generation of oxygen 130 are disposed in series. A pump 60 circulates superheated steam through the catalytic cells 100 and 130, each in turn, and through the boiler 10, pressure regulator 44 and the output modulation valve 46 in multiple passes. The boiler 10 is heated by multiple heat sources.

When hydrogen is liberated through dissociation of the superheated steam by the hydrogen catalytic cells 100, free oxygen is left commingled in the unreacted steam that leaves the catalytic cells 100 via the unreacted steam manifold 52. This unreacted steam is now rich in free oxygen because the hydrogen catalytic bank has removed a portion of $H_2$. The unreacted steam and oxygen flowing in manifold 52 is next delivered to the inputs of oxygen catalytic cells 130. The cell banks are in cascade.

The commingled free oxygen is readily captured by the oxygen catalytic cells 130 and more superheated steam is additionally dissociated. When the oxygen catalytic cells 130 leave behind unreacted steam, free hydrogen is commingled with the steam because the oxygen catalytic bank has removed a portion of $O_2$. This mixture of unreacted steam and hydrogen is amassed in and travels through manifold 58. The mixture of unreacted steam and $H_2$ is then circulated by pump 60, passed through unreacted steam valve 61, reheated in the boiler 10 and fed back to the hydrogen catalytic cells 100, where the free hydrogen is readily captured and more steam is dissociated during another pass. The process is repeated as the circulation continues and hydrogen and oxygen gases are produced and collected by the output manifolds 54 and 56 of the cell banks. The gases are delivered to a high-temperature fuel cell 80. The reaction heat contained in the regenerated water produced by the fuel cell and combustion heat from a small hydrocarbon burner maintain the boiler and superheated steam at the proper temperature for continued operation.

First and Second Embodiments Constrasted

The first embodiment, in accordance with FIG. 1, contains a dissociation catalytic cell bank 100 that functions to evolve only $H_2$ from superheated steam. The resulting constituent $O_2$ created by cleaving the bonds of the binary compound of $H_2O$ is left commingled with unreacted steam and both are returned to the boiler 10 by means of the circulation loop driven by circulation pump 60.

The oxygen required for the fuel cell in the first embodiment is derived from the oxygen found in atmospheric air (about 20%). The volumetric induced pressure swings, caused by the action of the output modulation valve, are not compensated for in the first embodiment.

The second and most preferred embodiment, in accordance with FIG. 2, generates both diatomic oxygen and diatomic hydrogen by the dissociation of water using two types of ambipolar cermet membranes in catalytic cell(s) 100 and catalytic cell(s) 130.

The system volume in this embodiment changes significantly as the output modulation valve feeds superheated steam to the catalytic cell bank because the catalytic converters are of a greater volume. The resulting shift in pressure is compensated for in the second and most preferred embodiment through the addition and resulting action of pressure by-pass ballast 90.

Detailed Description of the First Preferred Embodiment

Referring to FIG. 1, a schematic view of a system of a first embodiment of the present invention is shown. The first embodiment contains a boiler 10 with multiple heat sources 12, 14, and 16. Heat source 12 is an electric heater and heat source 14 is a small combustion burner fired by any number of fuels such as listed in Table 10. Heat source 16 is the reaction heat content of the fuel cell transferred to the boiler by the energy content of the steam generated by fuel cell 80 or thermal transfer conduit 76. The boiler produces superheated steam at 800° C. The superheated steam is limited by pressure regulator 44 and fed through output modulation valve 46 to a dissociation catalytic cell bank 100 functioning to evolve $H_2$ from superheated steam supplied through steam input manifold 50.

When the superheated steam is dissociated and hydrogen is evolved the constituent $O_2$ is left commingled with unreacted steam. The mixture of $O_2$ and superheated steam is returned to the boiler 10 by means of the circulation loop consisting of an unreacted steam conduit 58, a circulating pump 60 and an unreacted steam return valve 61.

The hydrogen produced by catalytic cell bank 100 leaves the cell bank via hydrogen manifold 54, passes through hydrogen secondary thermal controller 55 by action of the hydrogen fuel pump 62. The hydrogen fuel pump 62 delivers hydrogen at a suitable pressure through pressure regulator 64 and into fuel cell 80.

The oxygen required for the fuel cell 80 in this embodiment is derived from the oxygen found in atmospheric air (about 20%) entering the system through an inlet 71 and blower 72.

The fuel cell 80 depicted in the present invention is in the class of high temperature fuel cells. The fuel cell and the supporting system, within the present invention, are configured to generate 50,000 watts of electrical power. The preferred fuel cell type is a solid oxide fuel cell (SOFC). A molten carbonate fuel cell (MCFC) can also be used. Both of these fuel cells operate at a temperature from about 800° C. to 1,000° C. Such fuel cells are well known in the art. Other high temperature fuel cells may be used. Fuel cells that operate at a lower temperature may be used, but more hydrocarbon fuel would have to be combusted to maintain the proper operational superheated steam temperature.

System Command and Control

Figure 12:
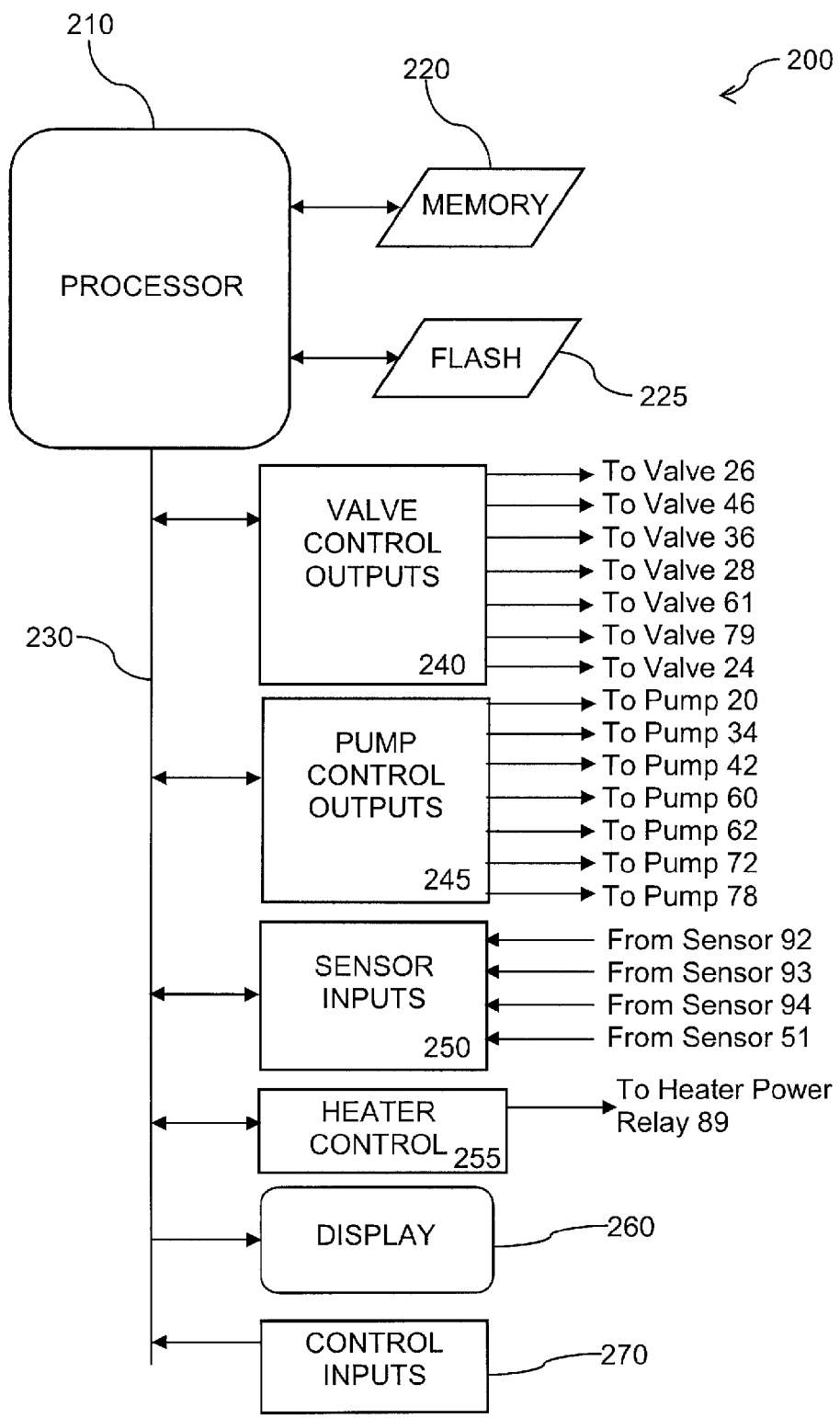
FIG. 12 illustrates a schematic view of an exemplary controller of all embodiments of the present invention.

To control the system of the present invention, a microprocessor or controller 200, shown in FIG. 12, monitors pressures and controls valves 24, 26, 28, 36, 46, 57, 61, 79, 91 and pumps 20, 34, 42, 60, 62, 72, 78. The working fluid levels, pressures, combustion sources, electric heaters, and temperatures are under command of this controller. Data from an array of sensors 51, 55, 65, 92, 93, 94 are processed. All operator inputs are processed, and a multitude of operational modes is commanded by the processor.

The superheated steam generation is achieved by a boiler-pressure reservoir 10, which is fired by multiple heat sources 12, 14, and 16. A pressure regulator 44 and output modulation valve 46 feed the superheated steam to a bank of catalytic cells 100 where hydrogen is generated by dissociation of superheated steam. Initially, an electric heater 12 raises the temperature of water in boiler-pressure reservoir 10 to the required operational temperature, 800° C. in this example.

Before initiating this heating, the controller 200 opens the cold start battery switch 89 and closes the modulation valve 46, and other valves 24, 26, 28, 36, 46, 61, 79, 91. This action isolates the boiler 10. Water at ambient temperature is then transferred to the boiler 10 from water storage tank 18 under control of the controller 200.

Feed water valve 26 is opened and water is transported via feed pump 20. During a cold start, the feed water passes through feed water heater 22 and through the heater output valve 26 and into boiler 10. The amount of water transferred is preferably from 200 ml to 500 ml or a maximum of 27 moles of $H_2O$. The preferred amount in this example is 440 ml or 24.4 moles. A mole of water has a mass of 18 grams and a volume of 18 ml. The correct volume of water is transferred under control of the controller 200 using a temperature sensor 93, a level sensor 94 and a pressure sensor 92.

If the temperature is at ambient and the pressure is 0 PSIG, there is no steam in the boiler 10. Under these conditions the level sensor 94 can accurately meter the flow of water into the boiler 10, and the transfer can be terminated after the boiler contains the preferred 440 ml to a maximum 500 ml of water.

After the transfer of water, the controller 200 closes the cold start battery switch 89, and the electric heater 12 is activated. In the preferred embodiment, it will take a 5,000 W electric heater 12 seven minutes to raise the temperature of 500 ml of water to a temperature of 800° C., after which, the pressure in boiler 10 will have increased to a predetermined pressure of 100 to 250 PSIG as detected by pressure sensor 92. The specific pressure will depend on the fluid level and other parameters selected and programmed into the controller 200. In the preferred embodiment the total system volume is approximately 157 liters. For an initial water level of 440 ml, the preferred pressure is approximately 200 PSIG once the operational temperature has reached 800° C.

Energy Required to Start

To start the process, 500 ml (500 g) maximum of water must be raised in temperature from ambient at 25° C. to 800° C. This is the system operational temperature required to maintain the 800° C. superheated steam for the hydrogen-oxygen production subsystem. The fuel cell may require preheating according to the selected fuel cell, as determined by the manufacturer.

A 5,000 W electric heater is used to create superheated steam. Alternately, a 3,000 W (10,500 BTU/hr) gasoline combustion heater could be used. By definition, it takes 1 calorie to raise 1 gram of water 1° C. This is the equivalent to 4.187 J/gram/degree. From 25° C. ambient to 100° C., the energy required is 75°·4.187 J·500 gm=157.01 kJ.

At 100° C. the heat of vaporization of 40.7 kJ/mol must be applied. The number of moles of water in 500 ml is 27.8 mol. The heat of vaporization is 27.8 mol·40.7 kJ/mol=1,131 kJ.

For superheated steam, additional energy is required to raise the temperature from 100° C. to 800° C. This energy is 2.345 kJ·kg$^{-1}$ (° C.)·700°·0.50 kg=820.75 kJ. Recognize that the Cp for steam is different than the Cp for water.

The total energy required to bring 500 ml (500 g) of water to superheated steam at 800° C. is 157.01 kJ+1,131 kJ+820.75 kJ=2,109 kJ The system will reach operational temperature in seven minutes (420 seconds) with a 5 kW electric heater. Note the available heat content of 500 gm of water @800° C.=2,070 kJ.

In mobile applications, the vehicle operator need not wait for the temperature and pressure to build before placing the vehicle in motion. The vehicle is propelled by an electric traction motor 88, which is powered by high capacity battery 85. The fuel cell electrical power is delivered to charge regulator 84 and maintains the charge of battery 85.

Soft Thermal Warm-Up

The catalytic cell bank assemblies cannot be subjected to major thermal shock as would occur during a rapid change the temperature from ambient to 800° C. Such a thermal shock due to differences in the thermal coefficients of expansion of the components would likely cause structures within the assembly to catastrophically fail.

This problem is overcome by a control regime within the microprocessor. The microprocessor senses the rise in boiler temperature upon start up. As the boiler temperature rises to 100° C. and begins steam production, the output modulation valve is momentarily opened and a small quantity of steam at 100° C. is circulated through the catalytic cell bank.

As the boiler continues to increase in temperature and when the steam temperature arrives at 200° C., the output modulation valve again opens momentarily and again, a small quantity of steam at 200° C. is circulated through the catalytic cell bank. This process is continued in 100° C. intervals until the operating temperature level of 800° C. is reached. In this process, the catalytic cells are increased in temperature at a rate of approximately 100° C. per minute. This controlled, gradual, increase forestalls rapid thermal expansion to the extent that might end in catastrophic failure of the catalytic cell structures.

As discussed, an electric heater 12 is used to initialize the process. Thereafter, the heat from the exothermic reaction of a high-temperature fuel cell 80 is transferred by the regeneration of high temperature steam returned to the boiler 10 by the second of two processing loops and a heat exchanger 16 within the boiler 10. These sources of heat are used to sustain the operational superheated steam temperature used in the dissociation of additional fuel. The fuel cell 80 is provided with a fan 87.

The thermodynamic losses in the system are overcome by the action of a small combustion heater 14 that in one preferred embodiment uses a small amount of conventional fuel such as gasoline or diesel fuel. The gasoline or other fuel as depicted in Table 10 is stored in a tank 40 and pumped under the control of the controller 200 by a fuel pump 42 into combustion heater 14.

The superheated steam exits the boiler 10 and enters pressure reduction regulator 44. This regulator 44 is a one or two-stage device. The regulator 44 reduces the pressure of the boiler to an intermediate pressure in the first stage, and then the second stage of the regulator further reduces the pressure to approximately 100 PSIG. The action of the pressure regulator 44 must be such as to maintain a mass flow value of at least 1 kilogram per minute per the present example. The superheated steam at 100 PSIG and 800° C. exits the regulator 44 and is input to an output modulation valve 46. The output modulation valve 46 controls the quantity of steam that enters the hydrogen catalytic converter cell(s) 100.

The fuel cell 80, during its operation, chemically regenerates water ($H_2O$). The water leaves fuel cell 80 via water output line 77 and enters a regenerated water return pump 78. The regenerated water return pump 78 increases the pressure of the water (as steam) by at least 10 PSI greater than the boiler 10 pressure and returns the water to the boiler through regenerated water boiler input valve 79. The system regenerates most of the water that is used in its fuel generation processes.

Most of the reaction heat, generated by the recombination of hydrogen and oxygen (an exothermic chemical process), is returned to boiler 10 via the thermal content of the regenerated water output from the fuel cell. Additional heat from the fuel cell assembly is also provided to the boiler 10 via the thermal transfer conduit 76 into the heat exchanger 16.

The fuel cell is cooled to maintain a suitable operating temperature by heat transfer using, preferably, a liquid medium. The heat is captured by the reaction heat transfer conduit 76 and is coupled to the heat exchanger 16. Additionally, the heat transfer conduit 76 is coupled to the feed water supply heater 22 through a heat transfer valve 24. This small heater is used to preheat small quantities of supplementary water, should water make-up be required during operation. When such transfers of water must be made during "running mode" and the boiler is at operational temperature, the water pre-heater 22 is used to heat the water for introduction into the boiler 10. The water pre-heater 22 is not used for a normal "cold start".

The electrical output of the fuel cell is delivered to the charge regulator 84. The charge regulator monitors the state of charge of the battery 85, and the controller 200 measures this state of charge and controls the flow of steam through the output modulation valve 46 and thus the amount of hydrogen produced and consequently the amount of electrical power produced by the fuel cell 80.

In an electric vehicle, the battery 85 is maintained in a charged state and the DC power is fed to an inverter 86 through connection 96 to power an electric traction motor 88. In an embodiment of the present invention, the system is capable of generating at least 50 kW, and powering a typical 67 horsepower electric traction motor.

In a stationary power application, the fuel cell 80 power is fed directly through a suitable inverter (not shown), which converts the direct current (DC) generated by the fuel cell 80 to alternating current (AC) for delivery to an AC load or power grid.

Control of Hydrogen Production

The apparatus in the present invention is designed to generate hydrogen as needed on demand. The purpose of the fuel cell in the present invention is to maintain the battery 85 at full charge and to provide additional current during peak demands. The hydrogen fuel flow is modulated in accordance with these demands by the output modulation valve 46. The state of charge of the battery 85 is continuously monitored by the controller 200 and the output modulation valve 46, preferably using pulse-width-modulation (PWM), directs the steam flow to the input of the hydrogen catalytic converter cells 100 in order to effect control of the hydrogen generation function. Only enough hydrogen is produced and delivered to the fuel cell 80 in accordance with the real time demand.

The pumps 20, 34, 42, 60, 62, 72, 78, valves 24, 26, 28, 36, 46, 61, 79, and sensors 92, 93, 94, 51, 55, 65 are under control of the controller 200 and are used to manage the process. Safety monitoring and over-ride modes are included to protect the battery 85, to prevent excessive hydrogen production, and to prevent excessive pressure in the boiler 10. The output modulation valve 46 controls the amount of superheated steam that is fed to the hydrogen catalytic cell bank catalytic converters 100. The output modulation valve 46 receives control signals from the controller 200. The output modulation valve 46 is capable of either analog degrees of flow or full on—full off digital modulation. Under certain controlled regimes, a combination of the two is possible, i.e., digital control of 10%, 30%, or 60% of the flow rate (or any other percentage) by digitally pulsing the value 46 from a partially open flow rate to fully closed. The preferred control of the valve 46 is digital pulse width modulation (PWM). In this control mode the PWM sequences rely on a total period of 20 minutes. The output flow magnitude is equal to:

$$\frac{T_{on}}{T_{on}+T_{off}}$$

$T_{on}+T_{off}$ is equal to the total period of 20 minutes. A PWM flow of 10% would result if $T_{on}$ was equal to 2 minutes and $T_{off}$ was equal to 18 minutes. A PWM flow of 50% would result for a $T_{on}$ of 10 minutes and a $T_{off}$ of 10 minutes. A PWM flow of 90% would result for a $T_{on}$ of 18 minutes and a $T_{off}$ of 2 minutes. Hydrogen generation is suspended when $T_{on}$ is equal to 0, and hydrogen generation is continuous when $T_{on}$ is equal to 20 minutes.

Analog PWM flow is achieved by a similar process, but the valve is cycled from 50% open to 100% closed or any other desired ratio. By these means and methods, the flow of hydrogen and/or oxygen can be regulated, and as a result, the fuel cell 80 electrical output is controlled in accordance with the program in the controller 200. The specific duty cycles and/or analog amplitudes of the PWM sequences are determined by the charging profiles of the battery 85. The charge rates and levels are battery specific. This means that every battery by type or size requires different charge rates and levels. Battery charging parameters are set with the program in controller 200 and new battery technologies can be accommodated by program updates.

Management of Combustible Gases

The apparatus in the current invention is specifically designed to limit the commingling of combustible hydrogen and oxygen gases outside of the fuel cell proper. Another feature of the apparatus is that the hydrogen catalytic converter only generates hydrogen gas as it is used in the fuel cell. This feature avoids the storage of hydrogen gas.

However, there is one branch of the system where hydrogen and oxygen can reside collectively, other than within the internal structure of the fuel cell. This is because some of the diatomic hydrogen fed to the fuel cell 80, passes through the fuel cell unreacted, is expelled, and is commingled with the outflow of water from the fuel cell manifold 77. Some oxygen is likewise unreacted, and diatomic oxygen also exits the fuel cell via the output water stream. As a result there is hydrogen and oxygen that is collectively mixed in the superheated steam as it exits the fuel cell.

This situation is typical of most, if not all, fuel cell stack structures, and is not a direct result of the configuration of the apparatus in the present invention. This could be a potentially combustible mixture. As described in the cascade and recirculating catalytic converter section, subsequent passes through the process loop result in a state of equilibrium between a mix of $H_2$, $O_2$, and $H_2O$ (as steam) as the catalytic cells remove and redirect the free hydrogen and free oxygen gases from the steam. They are then redirected into their respective and separate manifolds, while the fuel cell stack continues to release more unreacted gases into the stream. The fuel cell depicted in this apparatus is a purchased piece part from a fuel cell manufacturer.

The final result is that the catalytic cell bank cannot completely isolate the free hydrogen and free oxygen gases. The catalytic cell bank can only alter the relative concentration.

One way to remove the potentially combustible mixture is to add a small inline chamber to the water output manifold of the fuel cell stack. An enlargement 69 within regenerated water outflow manifold 77 is provided and is shown in FIG. 1 of the preferred embodiment. In this small section of the output steam manifold, multiple hot-wire glow plugs 70 with a suitable catalyst and a temperature sensor are disposed in the wall of the manifold. The purpose of the hot-wire glow plugs and a catalyst is to facilitate the slow recombination of the hydrogen and oxygen. The recombination is a controlled exothermic reaction, and serves to add additional heat to the output manifold and diminishes the ratio of combustible gases.

Power Required

In the preferred embodiments in a mobile application, for example, a 9 kWh battery is favored for use as battery 85. Such a battery is currently produced by Johnson Battery and marketed by E-Drive, Inc. Other batteries may be more suitable in stationary applications.

The power required to operate a typical electrical vehicle for any set of physical road conditions is determined by the exemplary equation in Table 1. This equation uses vehicle parameters based on a 2005 Toyota Prius automobile.

TABLE 1

Vehicle Energy Requirement Based on the 2005 Toyota Prius

| | |
|---|---|
| $m = 1.8*10^3$ | Vehicle Mass, kg |
| $p = 1.29$ | Air Density, kg m$^{-3}$ at STP |
| $C_D = 0.26$ | Aerodynamic Drag Coefficient |
| $v = 26.822$ | Vehicle Velocity, meters per second (60 MPH) |
| $\theta = 0.471239$ | Angle of Frontal Area Plane, radians |
| $W = 1.7247$ | Width of Front of Vehicle, meters |
| $H = 1.3462$ | Height of Vehicle, meters |
| $a = 0$ | Vehicle Acceleration, meters per second cubed |
| $G_{RD} = 0.0649$ | Surface gradient in radians |
| $g = 9.8$ | Gravitational Constant, meters per second squared |
| $C_R = 0.0085$ | Coefficient of Rolling Resistance |
| $Eff = 0.75$ | Efficiency of Electric Drive Train |
| $A_{VEH} = \sin(\theta)*(W*H)$ | Computed vehicle plane area normal to velocity vector |

$$P = \frac{m*a*v + 0.5*p*C_D*A_{VEH}*v^3 + m*g*v*\sin(G_{RD})}{10*Eff} \text{ Power, Watts}$$

| | |
|---|---|
| $P = 4.546 * 10^3$ | Watts, on a 6.5% grade surface, 60 MPH (Flat Surface) |
| $P = 23,860$ | Watts with (a = 3.0 meters per sec cubed), 60 MPH |

In a stationary power application, the fuel cell 80 power is fed directly to an inverter (not shown). The inverter converts the direct current (DC) generated by the fuel cell to alternating current (AC) for delivery to an AC load or power grid.

Detailed Description of the Second and Most Preferred Embodiment

Referring to FIG. 2, a schematic view of a system of the second and most preferred embodiment of the present invention is shown. In this embodiment, both diatomic oxygen and diatomic hydrogen are produced by the dissociation of water using two types of ambipolar cermet membranes in two cascaded dissociation catalytic cell banks 100 and 130. The first bank of cells 100 is chemically disposed to capture $H_2$ and the second cell bank 130 is disposed to capture $O_2$ Unreacted superheated steam from the cell banks is returned to the boiler 10 by means of the circulation loop steam return manifold 58, circulation pump 60 and unreacted steam return valve 61.

The second embodiment contains a boiler 10 with multiple heat sources 12, 14, and 16 that produces superheated steam at 800° C. The superheated steam is limited by pressure regulator 44 and fed through output modulation valve 46 to two sets of dissociation catalytic cell banks 100 and 130. The cell bank 100 functions to evolve $H_2$ from superheated steam supplied in manifold 50. Cell bank 130 functions to evolve $O_2$ from superheated steam supplied in manifold 52.

The hydrogen produced by catalytic cell bank 100 leaves the cell bank via hydrogen manifold 54, passes through hydrogen secondary thermal controller 55 by action of the hydrogen fuel pump 62. The hydrogen fuel pump 62 delivers hydrogen at a suitable pressure through pressure regulator 64 and into fuel cell 80.

The oxygen produced by catalytic cell bank 130 leaves the cell bank via oxygen manifold 56, passes through oxygen secondary thermal controller 65 by action of the oxygen fuel pump 72. The hydrogen fuel pump 62 delivers oxygen at a suitable pressure through pressure regulator 74 and into fuel cell 80.

The dissociation process to generate hydrogen and oxygen is achieved by non-galvanic means, wherein the superheated steam temperature of 800° C. is above the decomposition temperature of water in the abundant presence of the ambipolar cermet catalyst mounted within the converter(s) 100 and 130. A cascade of catalytic cells, one set for hydrogen 100 and one set for oxygen 130, is arranged in a unique "Cascade and Recirculate" configuration that greatly improves the throughput of the catalytic process.

The superheated steam flow is controlled by output modulation valve 46 and is distributed to the inputs 50 of the hydrogen catalytic converter cells 100. Pressure input to the catalytic cell banks is monitored by pressure sensor 51. Although four hydrogen catalytic converter cells 100, and four oxygen catalytic converter cells 130 are shown, any number of either type is possible. The controller 200 meters the mass flow of water to the boiler 10. The pressure of the boiler-pressure reservoir is measured by a pressure sensor 92 and the temperature is measured by a temperature sensor 93. During steam production, the liquid level sensor 94 cannot detect the specific steam quantity. Under these conditions, the controller 200 solves for the mass quantity in the system in moles, N, (the preferred value in this example is 24.4 moles) by use of the mathematical relationship:

$$N = \frac{P*V}{R*T}$$

where,
R Known gas constant 62.361*0.01928=1.2020
P Pressure (normal=200 PSIG)
V Volume liters (normal=157.6 L)
T Temperature K (normal=1073 K) (1073 K 800° C.)

If the number of moles of mass is too low, make-up feed water from water storage tank 18. can be delivered to the boiler by the water feed pump 20 and pre-heated by the pre-heater 22.

If the number of moles of mass is too high, water can be returned to the water storage tank 18. The water return process requires several operations. The mass transferred from the boiler during operation is in the form of steam. The pressure of the excess steam is reduced by the reducing regulator 30, The excess steam is condensed by the condenser 32, and the fan 31, and the resulting water is returned to the water storage tank 18 by the action of a pump 34.

After leaving the $H_2$ catalytic cells 100 through steam manifold 52 the unreacted steam and commingled oxygen are fed to the oxygen catalytic converter cells 130 for the generation and production of oxygen. The steam enters the oxygen catalytic converter cells 100 in parallel, and in each cell, the steam is directed to wash over internal ceramic membranes. As an example, there are 2 sets of 4 membranes disposed in an orthogonal spatial configuration so as to collectively and exhaustively spray 5,000 cm$^2$ of surface area with superheated steam in each of four cells. Therefore, the four-cell catalytic bank collectively contains 20,000 cm$^2$ of surface area that are exposed to superheated steam.

The steam then exits the cells via the unreacted steam return manifold 58 of each respective cell. The steam is transferred by the circulation pump 60 that overcomes the boiler 10 internal pressure by 10 PSI and returns the superheated steam and gases to the boiler 10.

The evolved $H_2$ gas exits the $H_2$ gas outlet port 54 and is heated or cooled as required by the thermal control exchanger 55 and is fed to the hydrogen fuel pump 62. The hydrogen flow is increased in pressure by hydrogen pump 62 to approximately 45 to 55 PSI. The hydrogen fuel flow then enters a pressure regulator 64 which assures the hydrogen is at the proper pressure for passing to the fuel cell 80 through a $H_2$ input fed line 68.

Oxygen is transported from the oxygen catalytic converter cells 130 through $O_2$ output manifold 56 through the secondary thermal control 65 and to the oxygen pump 72 where the pressure of the oxygen is increased to 45 to 55 PSI. The oxygen passes through a pressure regulator 74 and is directed into fuel cell 80. The amount of oxygen required in volumetric units depends upon the power requirements of the application and efficiency of the fuel cell 80.

One method of determining the oxygen requirements is shown in the equations of Tables 2 and 3. The equation in Table 2 is used to compute the volume of oxygen required. The volume determined by the equation in Table 2 is subject to variation with temperature and pressure.

Another method of determining the oxygen requirement is shown in the equation depicted in Table 3. This calculation is based on molar units and is not subject to variation due to temperature or pressure.

TABLE 2

Volumetric Pure Oxygen Consumption Rate

| | |
|---|---|
| $E_{out}$ = 220 | System output Voltage |
| F = 96485 | Faraday's constant |
| $I_{out}$ = 228 | System output current, amps |
| $P_o$ = 760 | Oxygen input pressure |
| $R_{LT}$ = 62.361 | Gas constant liter, torr |
| $T_o$ = 273 | Oxygen Temperature, Kelvin |
| $t_{FC}$ = 60 | Fuel Cell reaction time, seconds |
| $Z_e$ = 4 | Excess electrons, $O_2$ |
| $E_C$ = 0.75 | Cell voltage |

$$N = \frac{E_{out}}{E_C} \quad N = 293 \text{ Cells}$$

$$V = \frac{R_{LT}*I_{out}*T_o*t_{FC}*N}{F*P_o*Z_e}$$

TABLE 2-continued

Volumetric Pure Oxygen Consumption Rate

| | |
|---|---|
| V = 232.911 | Liters of Oxygen per minute reacted at STP |
| $U_F$ = 0.50 | Oxygen Utilization Constant |
| $V_o = \dfrac{V}{U_F}$ | |
| $V_o$ = 465.822 | Liters of Oxygen per minute required at STP |
| $V'_o$ = 354.751 | Liters of Oxygen per minute required at 45 PSI |
| $V_o$ = 266.064 | Liters of Oxygen per minute required at 60 PSI |

TABLE 3

Molar Pure Oxygen Consumption Rate

| | |
|---|---|
| $E_{out}$ = 220 | System output voltage, volts |
| F = 96485 | Faraday's constant |
| $I_{out}$ = 228 | System output current Amps |
| $t_{FC}$ = 60 | Fuel cell running reaction time, seconds |
| $Z_e$ = 4 | Excess electrons, oxygen |
| $E_C$ = 0.75 | Cell Voltage, volts |
| $M_o$ | Number of Moles, pure oxygen |
| $U_F$ = 0.50 | Fuel utilization constant |

$$M_o = \dfrac{I_{out} * E_{out} * t_{FC}}{F * E_c * Z_e}$$

$M_o$ = 10.389 Moles of pure oxygen reacted per minute $$O_2 = \dfrac{M_o}{U_F}$$

$O_2$ = 20.795 Moles of pure oxygen required per minute

The pressure regulators 64 and 74 protect the fuel cell 80 from excessive fuel pressure and help equalize the hydrogen and oxygen input pressures to provide for proper operation of the fuel cell 80.

The system pressure is dependent on several parameters including the volume of the boiler and all the steam chambers of all the catalytic cells in use at any given time. The action of the output modulation valve alters the system volume as superheated steam is directed in and out of the catalytic cells.

In some embodiments, the pressure by-pass ballast 90 compensates for the changes in steam pressure. When the output modulation valve 46 is closed and steam is not directed into the oxygen specific catalytic converter cells 130 and into the hydrogen specific catalytic converter cells 100, the input valve 91 to the ballast is opened and steam is directed into the by-pass ballast chamber 90. The steam exits the ballast chamber via the by-pass ballast output valve 57, which directs the flow back into the circulation loop and into circulation pump 60. The volume of the pressure bypass ballast 90 is made equal to the volume of the collective steam chambers in the catalytic cell banks 100 and 130. While the system is running, the superheated steam is either directed into the catalytic cells 100 and 130, if hydrogen and oxygen production are required, or into the pressure by-pass ballast 90, if no gas production is demanded. The total volume remains constant and the pressure in the system is dynamically unchanged.

The superheated steam generation is achieved by a boiler 10, fired by multiple heat sources 12, 14, 16. Heat source 12 is an electric heater and heat source 14 is a small combustion burner fired by any number of fuels. Heat source 16 is a source of reaction heat created by the thermal content of the steam produced by the regenerated water output of the fuel cell 80, and the heat content of heat exchanger conduit 76 which is used to cool the fuel cell stack assembly 80. A pressure regulator 44 determines the input pressure and output modulation valve 46 directs the superheated steam to a bank of catalytic cell(s) 100 where hydrogen is generated, and to catalytic cell(s) 130 where oxygen is generated by dissociation from the steam.

A means is provided to effect transfer of a specific quantity of water to and from the boiler 10 and water storage tank 18. Water at ambient temperature is transferred to the boiler 10 from water storage tank 18 under control of the controller 200. A feed water valve 26 is opened and water is transported via the feed pump 20. During a cold start the water passes through a water heater 22 and out through the water valve 26 into the boiler 10. The heater is not active for a "cold start" transfer. The amount of water transferred is, for example, 200 ml to 500 ml or a maximum of 27 moles. A mole of water has a mass of 18 grams and a volume of 18 cc. The correct volume of water is transferred under control of the controller 200 using temperature sensor 93, level sensor 94, and pressure sensor 92. If the temperature is at ambient and the pressure is 0 PSIG, there is no steam in the boiler 10. Under these conditions, the level sensor 94 can accurately meter the flow, and the transfer can be terminated after the boiler contains the requisite amount of water, 200 ml to a maximum 500 ml of water. In this example of the most preferred embodiment the preferential level is 440 ml and 24.4 moles of water.

Before initiating this heating, the controller 200 opens the cold start battery switch 89 and closes the modulation valve 46, and other valves 24, 26, 28, 36, 46, 61, 79, 91. This action isolates the boiler 10. Water at ambient temperature is then transferred to the boiler 10 from water storage tank 18 under control of the controller 200.

After the transfer of water, the controller 200 closes the battery switch 89 and the electric heater 12 is activated. In the exemplary system, it will take a 5,000 W electric heater seven minutes to raise the temperature of 500 ml of water to a temperature of 800° C. As in the first embodiment there is a soft thermal warm-up sequence.

Soft Thermal Warm-Up

The catalytic cell bank assemblies cannot be subjected to major thermal shock as would occur during a rapid change in the temperature from ambient to 800° C. Such a thermal shock due to differences in the thermal coefficients of expansion of the components would likely cause structures within the assembly to catastrophically fail.

This problem is overcome by a control regime within the microprocessor. The microprocessor senses the rise in boiler temperature upon start up. As the boiler temperature rises to 100° C. and begins steam production, the output modulation valve is momentarily opened and a small quantity of steam at 100° C. is circulated through the catalytic cell bank.

As the boiler continues to increase in temperature and when the steam temperature arrives at 200° C., the output modulation valve again opens momentarily and again, a small quantity of steam at 200° C. is circulated through the catalytic cell bank. This process is continued in 100° C. intervals until the operating temperature level of 800° C. is reached. In this process, the catalytic cells are increased in temperature at a rate of approximately 100° C. per minute. This controlled, gradual, increase forestalls rapid thermal expansion to the extent that might end in catastrophic failure of the catalytic cell structures. As in the first embodiment, the energy required to start is calculated below.

Energy Required to Start

To start the process, 500 ml (500 g) maximum of water must be raised in temperature from ambient at 25° C. to 800° C. This is the system operational temperature required to maintain the 800° C. superheated steam for the hydrogen-oxygen production subsystem. The fuel cell may require pre-heating according to the selected fuel cell, as determined by the manufacturer. A 5,000 W electric heater is used to create superheated steam. Alternately, a 3,000 W (10,500 BTU/hr) gasoline combustion heater could be used. By definition, it takes 1 calorie to raise 1 gram of water 1° C. This is the equivalent to 4.187 J/gram/degree. From 25° C. ambient to 100° C., the energy required is 75°·4.187 J·500 gm=157.01 kJ.

At 100° C. the heat of vaporization of 40.7 kJ/mol must be applied. The number of moles of water in 500 ml is 27.8 mol. The heat of vaporization is 27.8 mol·40.7 kJ/mol=1,131 kJ.

For superheated steam, additional energy is required to raise the temperature from 100° C. to 800° C. This energy is 2.345 kJ·kg$^{-1}$ (° C.)·700°·0.50 kg=820.75 kJ. Recognize that the Cp for steam is different than the Cp for water.

The total energy required to bring 500 ml (500 g) of water to superheated steam at 800° C. is 157.01 kJ+1,131 kJ+820.75 kJ=2,109 kJ The system will reach operational temperature in 7 minutes (420 seconds) with a 5 kW electric heater.

Note the available heat content of 500 gm of water @800° C.=2,070 kJ.

As in the first embodiment, it should be noted that, in a mobile application, the vehicle operator need not wait for the requisite pressure before placing the vehicle in motion. The vehicle is propelled by electric traction motor 88, which is powered by high capacity battery 85. The time required to enter the vehicle and drive away would be the same as in any other electrically powered vehicle.

In all embodiments, the specified steam pressure and temperature will depend on the fluid level and the other parameters selected and programmed into the controller 200. The equation in Table 4 shows the system pressure and the relationship of the fluid levels, temperature, and a selected system volume. The state of the output modulation valve and ballast by-pass valve is reflected in the equation in Table 4.

TABLE 4

System Temperature, Pressure, and Volume Constraints

| | |
|---|---|
| R = 62.4 | Gas Constant |
| M = 8 | Number of Catalytic Converter Cells |
| $V_{cc}$ = 14.7 | Volume of Catalytic Converter Cells, Liters |
| $V_B$ = 40.0 | Volume of Boiler-Pressure Reservoir, Liters |
| T = 1073 | Operating temperature Kelvin, (800 deg C.) |
| $S_V$ = 1 | State of Output Modulation Valve |
| $S_B$ = 1 | State of Ballast Valve |
| $K_O$ = 1.0 | Regulator Offset Constant |
| FL = 480 | System Fluid Level, milliliters, grams |
| $B_V = M * V_{cc}$ | |

$$P = \frac{FL * R * T * 1.934 * 10^2}{18 * [(S_v * K_o * M * V_{cc}) + V_B + (1 - S_v) * (1 - S_B) * B_v]}$$

| | |
|---|---|
| P = 219.106 | System Pressure, PSI |
| P = 431.64 | System Pressure, PSI, OM Valve Closed, Ballast Closed |
| P = 219.106 | System Pressure, PSI, OM Valve Open, Ballast Open |
| $M * V_{cc}$ = 117.6 | Converter Volume, Liters |
| $B_V$ = 117.6 | Ballast Volume, liters |

After coming up to operational temperature, the pressure in boiler 10 reaches a predetermined pressure, e.g., 100 to 300 PSI as detected by pressure sensor 92. The preferred pressure in this most preferred embodiment is 200 PSI. The heat from the exothermic reaction of a high-temperature fuel cell 80 is used to help sustain the superheated steam temperature required for dissociation of fuel. Thermodynamic losses of the system in this most preferred embodiment are overcome by the action of a small hydrocarbon combustion heater 14 that uses a small amount of hydrocarbon fuel such as gasoline or diesel. Gasoline or diesel is preferred, but any fuel in Table 10 can be used. The fuel is stored in a tank 40 and pumped into the hydrocarbon heater 14 by a fuel pump 42. The amount of hydrocarbon fuel required to sustain operation is calculated herein.

The superheated steam exits the boiler-pressure reservoir 10 and enters pressure reduction regulator 44. This regulator 44 is a one or two-stage device. The regulator 44 reduces the pressure of the steam to an intermediate pressure and then in the second stage to approximately 100 PSIG. The action of pressure regulator 44 must be such as to maintain a proper mass flow as required, for example, at least 1 kilogram per minute. The superheated steam at 100 PSIG and 800° C. exits the regulator 44 and is input to the output modulation valve 46. The output modulation valve 46 controls the quantity of steam that enters the catalytic converter cells 100 and 130. Where hydrogen and oxygen gases are decomposed from the 800° C., 100 PSIG superheated steam.

Management of Combustible Gases

The apparatus in the current invention is specifically designed to limit the commingling of combustible hydrogen and oxygen gases outside of the fuel cell proper. Another feature of the apparatus is that the hydrogen catalytic converter only generates hydrogen gas as it is used in the fuel cell. This feature avoids the storage of hydrogen gas.

However, there is one branch of the system where hydrogen and oxygen can reside collectively, other than within the internal structure of the fuel cell. This is because some of the diatomic hydrogen, fed to the fuel cell, passes through the fuel cell unreacted, is expelled, and is commingled with the outflow of water from the fuel cell manifold. Some oxygen is likewise unreacted, and diatomic oxygen also exits the fuel cell via the output water stream. As a result there is hydrogen and oxygen that is collectively mixed in the superheated steam as it exits the fuel cell.

This situation is typical of most, if not all, fuel cell stack structures, and is not a direct result of the configuration of the apparatus in the present invention. This could be a potentially combustible mixture. As described in the cascade and recirculating catalytic converter section, subsequent passes through the process loop result in a state of equilibrium between a mix of $H_2$, $O_2$, and $H_2O$ (as steam) as the catalytic cells remove and redirect the free hydrogen and free oxygen gases from the steam. They are then redirected into their respective and separate manifolds, while the fuel cell stack continues to release more unreacted gases into the stream. The fuel cell depicted in this apparatus is a purchased piece part from a fuel cell manufacturer.

The final result is that the catalytic cell bank cannot completely isolate the free hydrogen and free oxygen gases. The catalytic cell bank can only alter the relative concentration.

One way to remove the potentially combustible mixture is to add a small inline chamber to the water output manifold of the fuel cell stack. An enlargement 69 within regenerated water outflow manifold 77 is provided and is shown in FIG. 2 of the second and most preferred embodiment. In this small section of the output steam manifold, multiple hot-wire glow plugs with a suitable catalyst and a temperature sensor are disposed in the wall of the manifold. The purpose of the hot-wire glow plugs and a catalyst is to facilitate the slow recombination of the hydrogen and oxygen. The recombination is a controlled exothermic reaction, and serves to add additional heat to the output manifold and diminishes the ratio of combustible gases.

Practical Fuel Cells

A practical high temperature fuel cell 80 that is designed to co-generate superheated steam will generate electrical energy with an efficiency of about 60%. Considering the use of the co-generation of superheated steam, as used by the present invention, the overall efficiency of fuel cell 80 is approximately 85%. The remaining 15% of energy is lost to the environment.

Examples of fuel cell 80 are Solid Oxide Fuel Cells (SOFC) and Molten Carbonate Fuel Cells (MCFC). These fuel cells operate at a temperature of between 800° C. and 900° C., although other selected fuel cells may have different operating temperatures. Both the SOFC and MCFC fuel cell types have a published maximum efficiency of 85%.

The theoretical maximum of the heat of formation is known to be 285.8 kJ/mol. The electrical energy output is 60% of 285.8 kJ/mol, and is equal to 171 kJ/mol. The energy content of the steam co-produced is 25% of 285.8 kJ/mol, or 71 kJ per mole.

This 71 kJ/mol of energy is available to provide part of the dissociation activation energy required to generate H2 and $O_2$ by catalyzed thermal processes. The catalyzed dissociation of water requires 99.06 kJ/mol. 99.06 kJ-71 kJ/mol leaves a value of 28.06 kJ per mole that must be supplied by another energy source. The other source of energy is the combustion of a small amount of hydrocarbon fuel, preferably unleaded gasoline or diesel fuel. Any other common fuel as shown in Table 10 could be used.

Combustion Energy

The hydrocarbon fuel unleaded gasoline is used to illustrate the principles and teachings of a hybrid thermodynamic system, but in practice any fuel could be used after adjusting the feed rate to the burner via the microprocessor program using the data and properties of common fuels listed in Table 10.

Unleaded gasoline is generally represented by the chemical formula of $C_8H_{17}$. Gasoline has, on average, an energy content of 18,500 BTUs per lb. The published values vary slightly from 18,200 to 18,900 BTUs per lb., based on specific composition.

A British Thermal Unit (BTU) has an energy value of 1054 Joules. A pound of gasoline has an energy content of 19,499 kJ. A pound of gasoline contains 454 grams. A gram of gasoline has energy content of 42.95 kJ. Gasoline weighs 6.2 lbs. or 2.815 kg per gallon.

The fuel cell system requires a hydrogen fuel flow rate of 600 liters per minute with a fuel utilization value Uf of 0.78. Six hundred liters of hydrogen gas at STP is 26.8 moles.

It has been shown that 28.06 kJ/mol must be supplied by the combustion energy source. At a rate of 26.8 mol/min of steam flow, the additional energy required is 28.06 kJ·26.8 mol/min., which is equal to 751.98 kJ/min. This energy can be supplied by the combustion of 17.5 grams of gasoline per minute. This is equal to 1,050 grams per hour, 2.31 lb. per hour and a final value of 0.375 gallons per hour for full output of the system.

(Note that for cruising at 60 mph, this value is 0.40·0.375=0.149 gallons per hour.

The system overall will generate 50 kW (translated into a mean value of 67 HP) of electrical energy, and generate 22.46 liters of superheated steam at 800° C., per hour.

The superheated steam will produce approximately 36,000 liters of hydrogen and 18,000 liters of oxygen by catalytic decomposition. The system will process and regenerate approximately 28.9 liters (7.6 gallons) per hour of water in the form of superheated steam that is dissociated in the hydrogen-oxygen generation process. The rate of water production, as a function of electrical output, is defined by an equation in Table 9.

Open Loop Processes Result in Loss

If the catalytic system was open loop, and if 22% of the hydrogen is unreacted, ($U_f$=0.78), the system would not replace 22% of 482.4 ml of the water processed per minute. Only 376.3 ml of water per minute would be regenerated. The unreacted hydrogen and oxygen would exit the fuel cell mixed in the water vapor (as steam) and leave in the output stream.

Catalytic Cascade and Recirculate Closed Loop Process

By contrast, since mass is conserved in a closed loop system, hydrogen, oxygen and water are not lost. Rather, the make-up of the working fluid dynamically changes in the catalytic processor, mass-flow, circulating loop. The hydrogen processor unit of the catalytic processor will capture and redirect, perhaps, 10% of the unreacted diatomic hydrogen (and unreacted oxygen) to the input ports of the fuel cell and more, but not all, water will be regenerated. Thus, the constituents of the working fluid in the loop always contains a mixture of $H_2O+H_2+O_2$ in a dynamic ratio. A small amount of the free $H_2$ and $O_2$ will be lost during a full shut-down procedure as the mixture is returned to the water storage tank. The very small amount of lost $H_2$ and $O_2$ will not be available to be reformed into $H_2O$ upon start up. As a result a small amount of water will be used by the system over time.

The fuel cell always regenerates most of the water that has been dissociated to liberate diatomic hydrogen and diatomic oxygen. The "Cascade and Recirculate" catalytic processor will, next in turn, always capture some of the free diatomic hydrogen or diatomic oxygen present as a mixture in the regenerated water (as steam) output of the fuel cell.

This is a complex, related rate process, owing to the fact, that the reaction rate of the fuel cell varies based on demand, and neither the fuel cell nor the catalytic dual port processor are 100% efficient in generation of hydrogen and oxygen or the formation of water. The theoretical $H_2O$ production rate, as a function of fuel cell output, is depicted by an equation in Table 9.

Computer Simulation

Computer simulation of these merged processes yields the formation of a state of equilibrium of water, diatomic hydrogen and diatomic oxygen over a short running time of a few minutes. A first principles simulation model can predict the dynamic loop constituents and their energy content at the molecular level running in a mode of 1 mole per second. The outputs of this simulation model depict the following results. The flow in the closed loop system transitions, from an initial charge of pure superheated steam, to a residual mixture of steam, hydrogen and oxygen.

This is a result of residual products from the dissociation function that is carried out in two separate stages, plus the unprocessed, unreacted products ($H_2$ and $O_2$) exiting the fuel cell. These residues, however, stay in the system and pass through the hydrogen and oxygen dissociation cermet membranes in subsequent passes, thus eventually participating in the conversion process. Since the processing loops within the present invention are closed the mass of steam, hydrogen or oxygen in any state is conserved.

For every mole of superheated steam present in the initial input to catalytic cells 100 and 130, the flow reaches a state of equilibrium consisting of 0.44 mol of steam, 0.37 mol of hydrogen, and 0.19 mol of oxygen The energy level of the circulation mass flow must be replenished prior to re-entering the catalytic cell banks 100 and 130 on subsequent circulation passes. This is done by adding enough energy to the gaseous mixture in the cascade loop to bring the temperature back to 1073 K (800° C.). This assures that the superheated steam will have enough available heat content (enthalpy) to participate in the continuing, endothermic $H_2O$ dissociation process. The simulation model predicts the required additive energy that is provided by the combustion of a small amount of gasoline. The heat of combustion of gasoline in the most preferred embodiment is used to maintain the boiler temperature at the proper operational level of 800° C.

Simulation Data Difference

Figure 9:
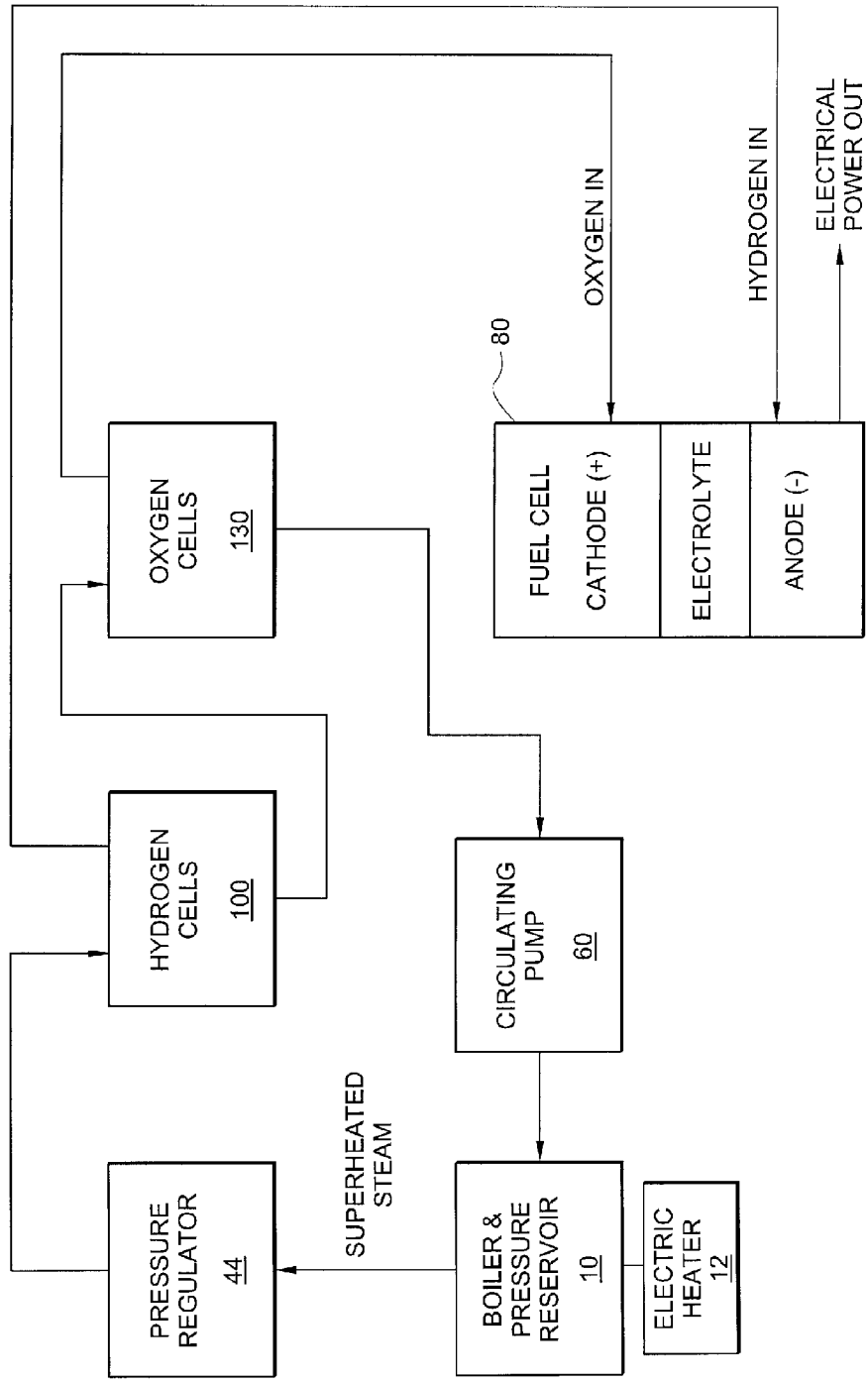
FIG. 9 illustrates a schematic view of the mass flow within the system during electrical power production of the second and most preferred embodiment of the present invention.
Figure 10:
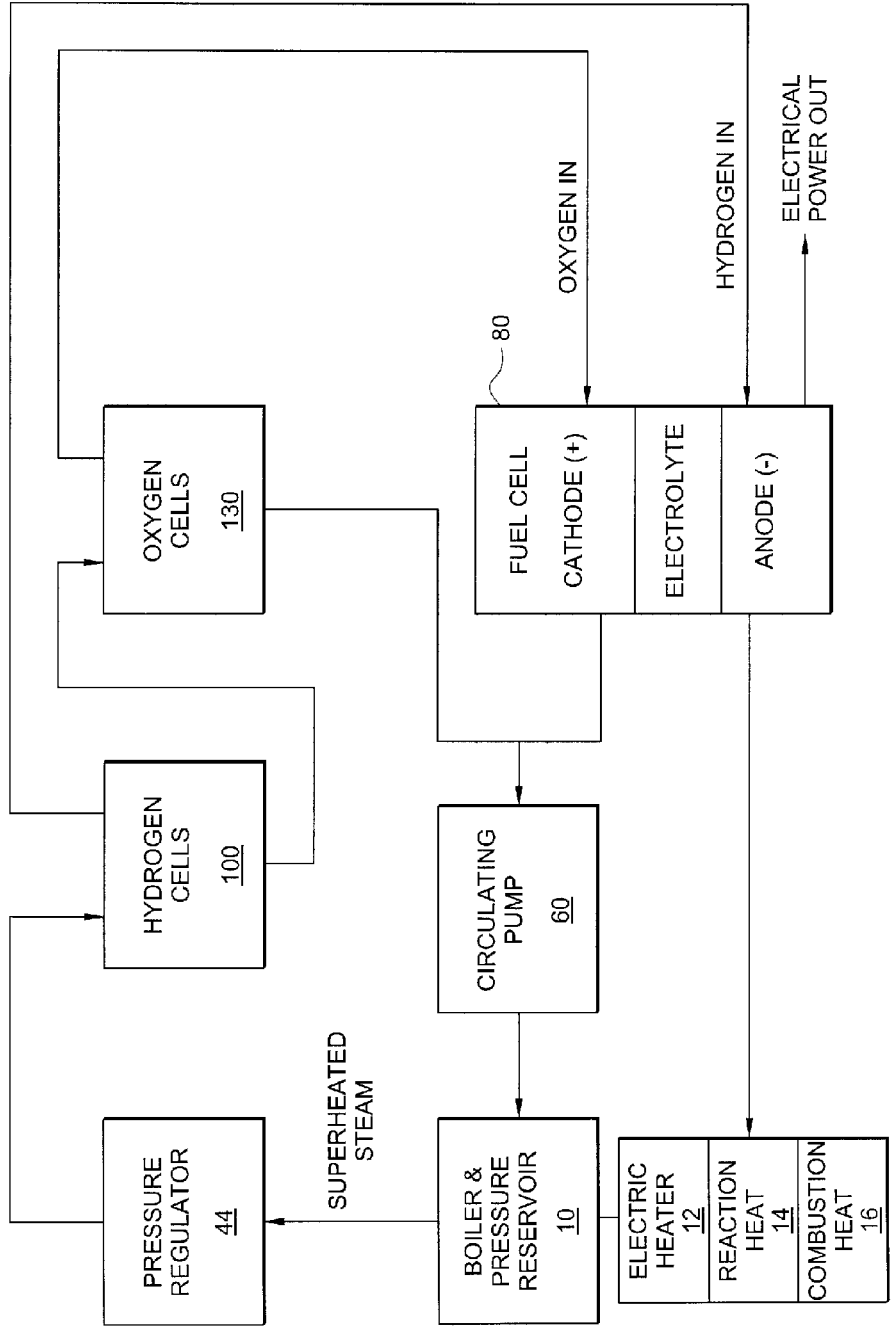
FIG. 10 illustrates a schematic view of the dual loop mass flow within the system during electrical power production of the second and most preferred embodiment of the present invention.
Figure 11:
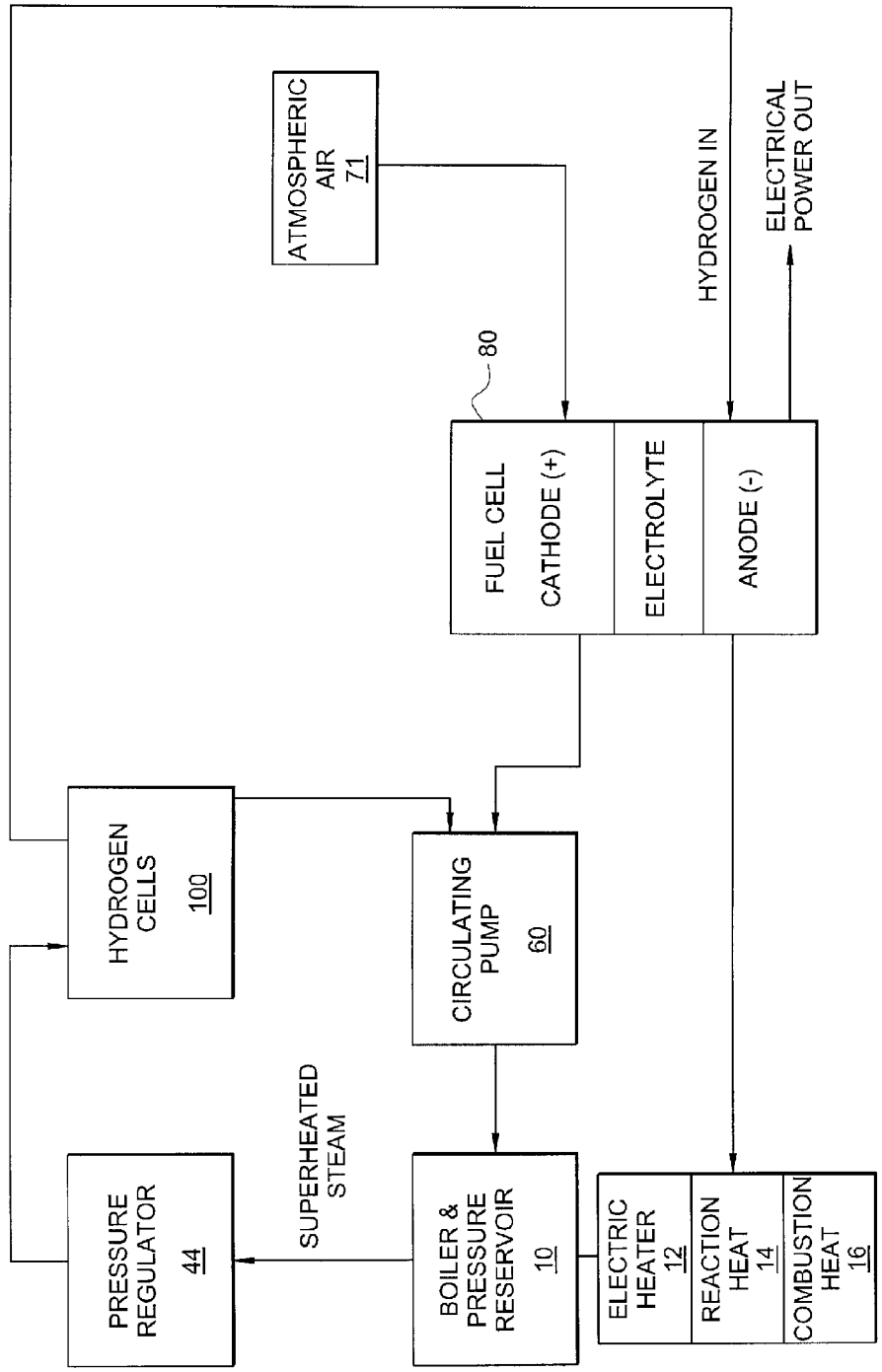
FIG. 11 illustrates a schematic view of the mass flow within the system during electrical power production of the first and preferred embodiment of the present invention.

The simulation data presented above is calculated in moles relative to the number of moles of superheated steam input to the process. Be advised that this data is in different units as contrasted with the mass flow data presented in FIGS. 9, 10 and 11. The mass flow data in FIGS. 9, 10 and 11 is tabulated in grams per minute as contrasted with moles of reactants relative to moles in the feed stream.

Performance of the System

Hydrogen will be saved compared to other fuel cell systems when the unique "Cascade and Recirculate" catalytic processor captures more than half of the unreacted hydrogen that is outcast into the fuel cell outflow water stream. Less water will be used in the dissociation process as free hydrogen is recaptured, and the regenerated water will slightly increase to 564 ml per minute. The result will translate into an improved ratio of $H_2O$ to $H_2$ and $O_2$ as constituents in the working fluid flow loop. The performance of the fuel cell and the catalytic processor will each be improved by about 11%.

For an elapsed time between refueling of 10 hours and a range of 600 miles, less than 1.5 gallons of gasoline and less than ⅛ gallon of water will be used. For this 10 hour run time, 31.6 gallons of water will be processed and recycled.

Based on a power level of 40% (27 HP) required for highway cruising, the expected hydrocarbon fuel utilization rating is 460 miles per gallon.

Energy Content of Hydrogen

Every type of fuel has a unique amount of energy based on the chemical makeup of the substance. Chemical fuels are flammable and when they are combusted or reacted with oxygen their energy content is released. Hydrogen gas is known to have an energy content (net enthalpy) LHV value of 241.8 kJ per mole. Note that a mole of hydrogen is 2 grams.

It is shown by the equation in Table 5 that the apparatus in the present invention uses an ideal amount of hydrogen equal to 20.8 moles per minute. It is referred to as ideal because the fuel utilization constant is neglected. The maximum energy content of this amount of hydrogen per minute is therefore 20.8·241.8 kJ per minute, which is equal to 5,029.4 kJ per minute, or 83.8 kJ per second.

| THE TOTAL SYSTEM WILL GENERATE | |
|---|---|
| Electrical Energy of 50 kW | (60% of 83.8 kW) at 241.8 kJ mol$^{-1}$ |
| Heat of Formation of 21 kW | (25% of 83.8 kW) at 241.8 kJ mol$^{-1}$ |
| Heat of Combustion of 12.1 kW | 28.1 kJ/mol · 0.447 mol$^{-1}$ |
| Chemical Energy of 9 kWh | (540 kJ) Stored (For a fully charged battery) |

TABLE 5

| Molar Hydrogen Fuel Consumption Rate | |
|---|---|
| $E_{out}$ = 220 | System output voltage, volts |
| F = 96485 | Faraday's constant |
| $I_{out}$ = 228 | System output current Amps |
| $t_{FC}$ = 60 | Fuel cell running reaction time, seconds |
| $Z_e$ = 2 | Excess electrons, hydrogen |
| $E_c$ = 0.75 | Cell Voltage, volts |
| $M_H$ | Number of Moles, hydrogen |
| $U_F$ = 0.75 | Fuel reaction utilization constant |
| $M_H = \dfrac{I_{out} * E_{out} * t_{Fc}}{F * E_C * Z_E}$ | |
| $M_H = 20.795$ | |
| $H_2 = \dfrac{M_H}{U_F}$ | |
| $H_2 = 26.660$ | Moles of hydrogen per minute |

Unique Thermodynamic Hybrid Improves Performance

The present invention exemplifies a unique hybrid utilization of new hydrogen fuel cells and conventional hydrocarbon fuels. The use of gasoline in an internal combustion engine is only about 30% efficient. However, the combustion of gasoline in the heater of a boiler to generate steam is more than 95% efficient. Fuel cells without co-generation of steam are only 60% efficient. Fuel cells that make use of what some call "waste heat", to co-generate steam are 85% efficient.

The two sources of heat, namely "Heat of Formation" from the fuel cell and the "Heat of "Combustion" of gasoline, can collectively be directed to supply the "Heat of Dissociation" via the boiler and the energy content of superheated steam. New ambipolar cermet catalytic substances and catalytic processors that are configured in a unique "Cascade and Recirculate" arrangement greatly improve $H_2$ and $O_2$ production. Further, the reactions proceed at a greatly reduced activation energy threshold for dissociation.

This will allow the catalytic dissociation of water on board a moving vehicle. Water is a plentiful, safe, hydrogen compound that under the right conditions can yield stoichiometric quantities of free (un-bonded), diatomic hydrogen and free, diatomic oxygen. Finally, electric traction motors powered by efficient fuel cells, by far, outperform internal combustion engines.

FIG. 3

The Catalytic Decomposition Cells

Figure 3:
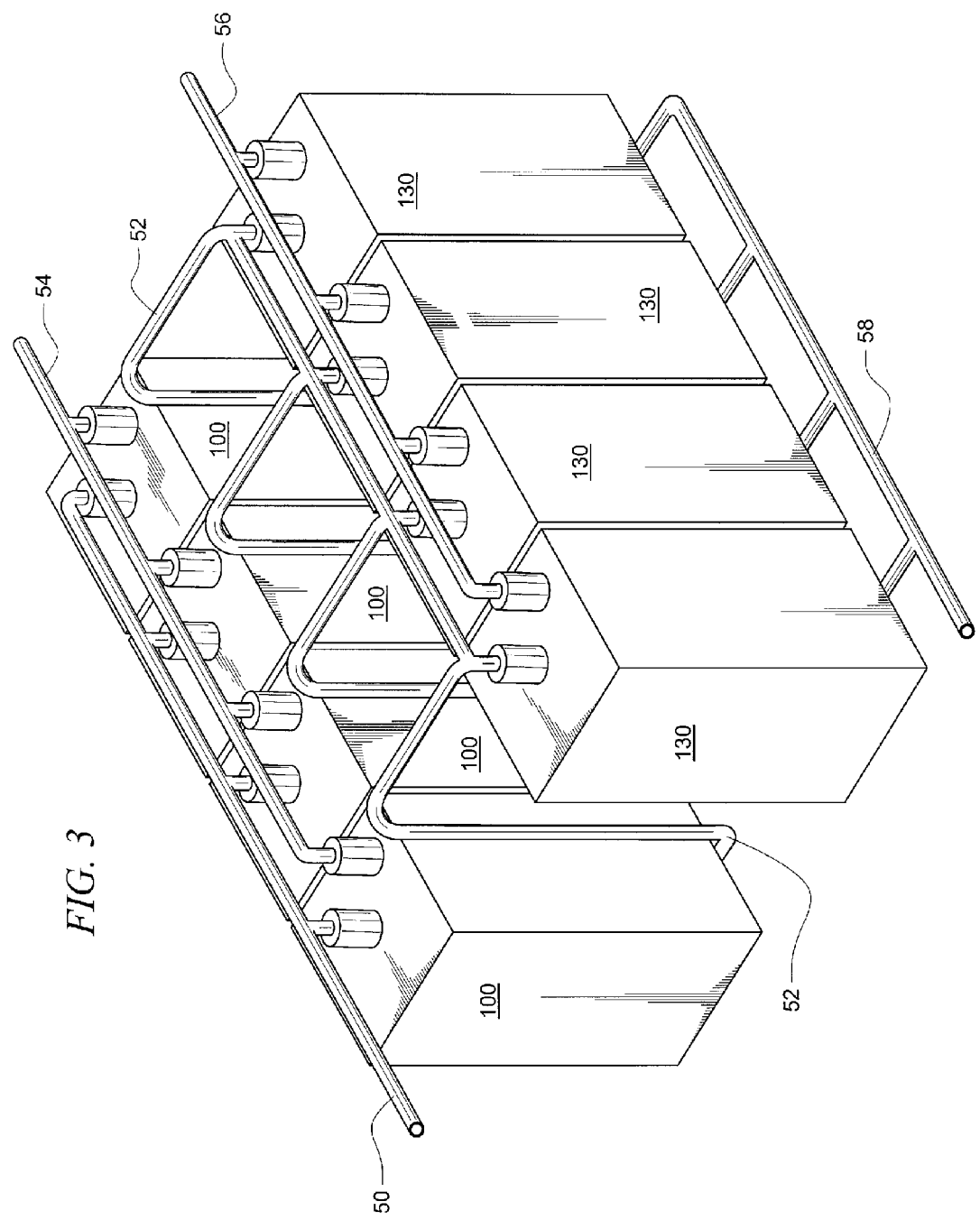
FIG. 3 illustrates an isometric view of the connections between the gas production catalytic cells of the second and most preferred embodiment of the present invention.

Referring to FIG. 3, an isometric view of the connections between the gas production chambers of the second embodiment of the present invention is depicted. Superheated steam from the modulation valve 46 passes through $H_2$ input manifold 50 and into each of the hydrogen catalytic converter cells 100. The hydrogen is collected from the hydrogen gas output ports of the catalytic converter cells 100 and is directed out through output manifold 54. Unreacted steam and commingled oxygen leaves cell bank 100 via manifold 52 and the mixture is directed to the parallel input ports of cell bank 130. The oxygen is collected from the oxygen gas output ports of the catalytic converter cells 130 and is directed out of the catalytic converter through manifold 56. Unreacted steam and commingled hydrogen leaves cell bank 130 via the steam return manifold 58.

Notice that although four hydrogen catalytic converter cells 100 are shown and preferred for the required amount of hydrogen production, any number of such cells greater than or equal to one will work in producing amounts of hydrogen. A specific area of cermet (ceramic and metal) membrane is needed to produce a required amount of hydrogen. A required specific area is attainable with more cells, when each of the cells have less cermet active area. Conversely less cells would be required for the same amount of hydrogen production if the cermet membranes each have a greater active working area.

Hydrogen from manifold 54 of catalytic converter cells is passed into the hydrogen secondary thermal controller 55 as visible in FIG. 2. The hydrogen secondary thermal controller raises or lowers the temperature of the gas as necessary. The output of the thermal controller is fed to the input port of hydrogen fuel pump 62. The hydrogen fuel pump 62 creates a low pressure via suction at the pumps input port, which is reflected at the gas output chambers of the converter cells. The hydrogen fuel pump raises the pressure of the hydrogen gas to about 45 to 55 PSIG for proper operation of the fuel cell, and feeds the hydrogen gas through pressure regular 64 to the input line 68 of fuel cell 80. The amount of hydrogen required for a desired power level is calculated in molar units by the equation of Table 5 and in volumetric units by the equation of Table 6.

TABLE 6

Volumetric Hydrogen Fuel Consumption Rate

| | |
|---|---|
| $E_{out} = 220$ | System output voltage, volts |
| $F = 96485$ | Faraday's constant |
| $I_{out} = 228$ | System output current, Amps |
| $P_H = 760$ | Hydrogen input pressure, torr |
| $R_{LT} = 62.361$ | Gas constant, liter, torr |
| $T_H = 273$ | Hydrogen temperature, Kelvin |
| $t_{FC} = 60$ | Fuel cell running reaction time, seconds |
| $Z_e = 2$ | Excess electrons, hydrogen |
| $E_C = 0.75$ | Cell Voltage, volts |
| N | Number of cells in the stack |
| V | Volume, liters |

$$N = \frac{E_{out}}{E_C} \quad N = 293 \text{ Cells}$$

$$V = \frac{R_{LT} * I_{out} * T_H * t_{FC} * N}{F * P_H * Z_e}$$

| | |
|---|---|
| V = 465.822 | Liters of Hydrogen per minute reacted at STP |
| $U_F = 0.78$ | Fuel Utilization Constant |

$$V_H = \frac{V}{U_F}$$

| | |
|---|---|
| $V_H = 597.207$ | Liters of hydrogen per minute required at STP |
| $V_H = 709.503$ | Liters of hydrogen per minute at 45 PSI |
| $V_H = 532.127$ | Liters of hydrogen per minute at 60 PSI |

Referring again to FIG. 3, the unreacted steam and oxygen mixture in manifold 52 enters into each of the oxygen catalytic converter cells 130. As before, although four oxygen catalytic converter cells 130 are shown and preferred for the required amount of oxygen production, any number of such cells greater than or equal to one will work in producing amounts of oxygen. A specific area of cermet (ceramic and metal) membrane is needed to produce a required amount of oxygen. A required specific area is attainable with more cells, when each of the cells have less cermet active area. Conversely less cells would be required for the same amount of oxygen production if the cermet membranes each have a greater active working area.

Oxygen from manifold 56 is passed through the oxygen secondary controller 65 as visible in FIG. 2. The thermal controller raises or lowers the temperature of the gas as necessary. The output of the thermal controller flows to the input port of oxygen fuel pump 72. The oxygen fuel pump 72 creates a low pressure via suction at the pump's input port, which is reflected at the gas output chambers of the oxygen converter cells 130. The oxygen fuel pump raises the pressure of the oxygen gas to about 45 to 55 PSIG for proper operation of the fuel cell, and feeds the oxygen gas through pressure regulator 74 to the oxygen input line of fuel cell 80.

The mixture of unreacted steam and commingled hydrogen leaving cell bank 130 and the catalytic converter assembly via steam return manifold 58 is directed to the input port of circulating pump 60 for recirculation as visible in FIG. 2

Figure 4:
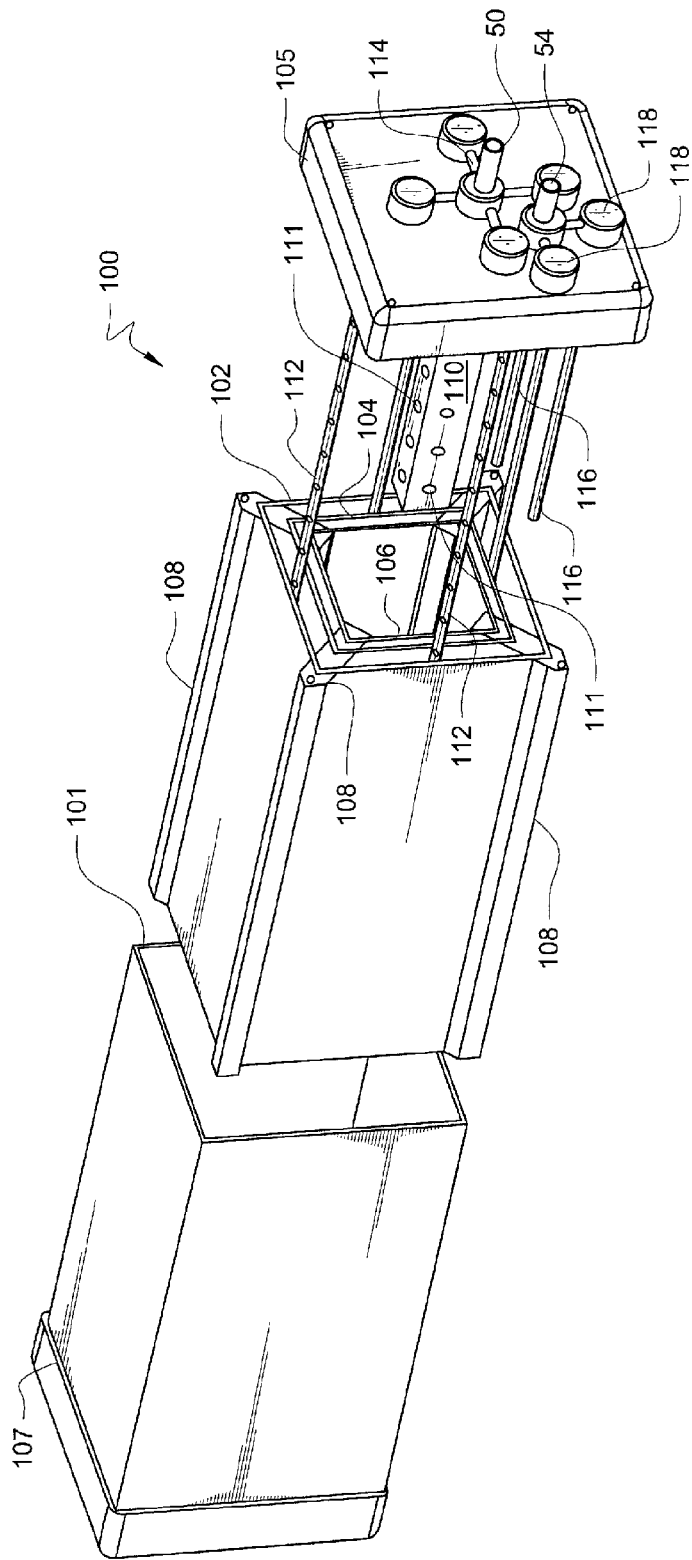
FIG. 4 illustrates an exploded isometric view of the hydrogen gas production chambers of all embodiments of the present invention.
Figure 5:
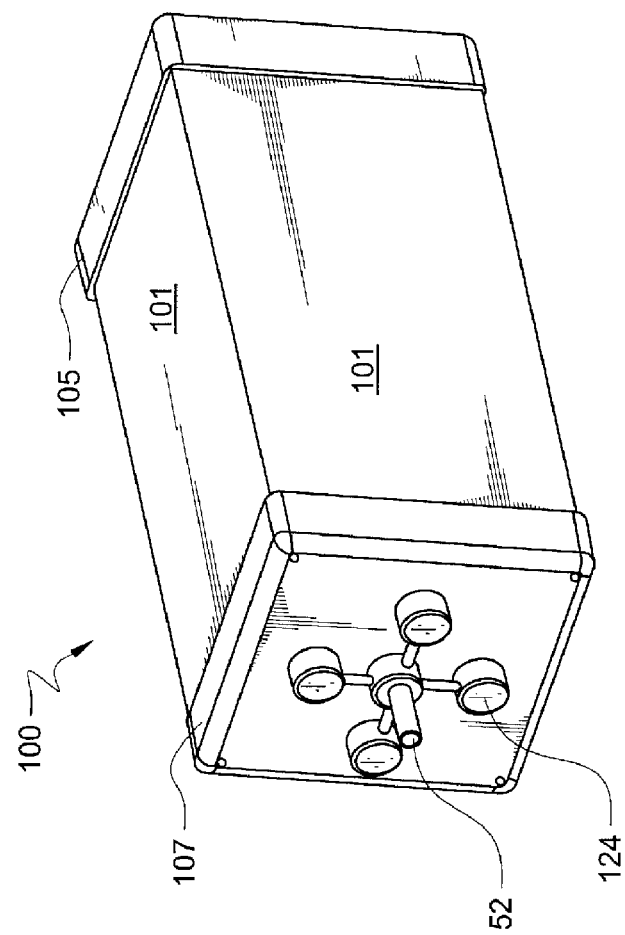
FIG. 5 illustrates an isometric view of the bottom of the hydrogen gas production chambers of all embodiments of the present invention.

FIGS. 4 and 5

Internal Construction of Hydrogen Catalytic Cells

Referring to FIGS. 4 and 5, an exploded view of the internal construction of the hydrogen gas production catalytic cells 100 of all embodiments of the present invention is shown. The shape and configuration of the hydrogen catalytic converter cells 100 may be variable based upon the rate of hydrogen production, available space and manufacturing requirements. The shape, size, layering, support structures and plumbing as shown are an exemplary description of the hydrogen catalytic converter cells 100.

In some embodiments, the hydrogen catalytic cells 100 are mechanically identical to the oxygen catalytic cells 130 (see FIGS. 6 and 7) with the exception that catalytic cells for hydrogen production have ambipolar cermet membranes 102 and 106 chemically suited for hydrogen production. By contrast, the catalytic cells for oxygen production 130 are disposed with ambipolar cermet membranes 132 and 136 chemically suited for oxygen production. Within the preferred embodiments the catalytic cell assemblies are fabricated from Stabilized Austenetic 321 or 347 stainless steel. Other high temperature materials may be used that are suitable for corrosive resistant operation at 800° C.

The hydrogen production system uses superheated steam to produce hydrogen by decomposition of water (as superheated steam) using catalytic chemical membranes. The thermal content of the superheated steam provides the energy for the endothermic decomposition process and the superheated steam provides the constituent diatomic hydrogen gas. The catalytic membranes for hydrogen production are the subject of U.S. Pat. No. 6,468,499 B1, "A Method of Generating Hydrogen by Catalytic Decomposition of Water", U. Balachandran, et al, and U.S. Pat. No. 6,726,893 B2, "Hydrogen Production by High Temperature Water Splitting using Electron-Conducting Membranes", T. H. Lee, et al, both of which are incorporated by reference.

The flow of steam is controlled by output modulation valve 46 and is distributed via tube 50 to the input manifold 114 of the hydrogen catalytic converter cells 100. Within the present invention the steam enters all four cells 100 in parallel. As an example of preferred construction one such cell is depicted here in FIG. 4. In each cell, the steam is directed to wash over ceramic membranes 102 and 106, disposed in an orthogonal spatial configuration with 4 inner membranes 106 and 4 outer membranes 102 forming concentric geometric prism structures. This exemplary mechanical structure maximizes the surface area within a given overall enclosed volume. Shown is but one possible configuration to maximize surface area versus contained volume.

Superheated steam dispenser tubes are arranged to collectively and exhaustively spray approximately and preferably 5,000 $cm^2$ of surface area of membrane per cell. The inner dispenser tube 110 is disposed with dispenser holes 111 on each of four sides. The steam is directed to each of the four membranes 106 by the dispenser tube 110. The outer dispenser tubes 112 are disposed with dispenser holes 111 on each of four separate tubes. The steam is directed to each of the four membranes 102 by one dispenser tube 112 per each of four outer membranes 102.

It is preferred that the steam be directed from the 4 outer dispenser tubes at the outer set of ceramic membranes 102 at an angle of approximately 70° to affect maximum turbulence and surface coverage to maximize hydrogen production. The 70° hole offset pattern is not visible in this view, but can be seen in the cross section depicted in FIG. 8.

As a consequence of exposure to turbulent superheated steam at 800° C., the membranes cause the constituent diatomic hydrogen gas to be evolved on the far side of all the membrane surfaces 106 and 102. The evolved gas collects in a closed gas containment chamber bounded by enclosure walls 104 for the inner chamber and enclosure walls 102 for the outer gas collection chamber. The hydrogen gas produced and collected in the gas containment chambers leaves the inner and outer chambers by gas port tubes 116. The steam input port 50 and inlet manifold 114 enter the cell 100 via the end cap 105. The gas output port 54 with inner and outer outlet manifold 118 exit the cell via end plate 105.

In the preferred and most preferred embodiments of the present invention catalytic banks of four hydrogen catalytic converters 100 are incorporated and collectively contain 20,000 $cm^2$ of surface area of catalytic membranes. Each catalytic cell will generate 150 liters of $H_2$ per minute and a bank of 4 cells with an active membrane area of 20,000 $cm^2$ will generate 600 liters of hydrogen per minute.

In FIG. 5, a bottom view of a catalytic cell 100 is shown. The unreacted steam exits the cells 100 via the outlet manifold 124 and steam output port tube 52 of each respective cell 100. Shown in this view is the bottom cap 107 and outer gas containment wall 101. Housing 101 also forms the external cover for the whole assembly.

Referring to FIG. 4, in the preferred embodiment, the ceramic membranes and their substrates 102 and 106 are held in place and sealed with supports 108. The ceramic membranes 102 and 106 and supports 108 are sealed within the outer barrier 101 and end caps 105 and 107. The seals are arranged so that two separate steam chambers and two separate gas collection chambers are formed. The four internal volumes, so formed, are not open to each other. Steam enters and steam leaves, and evolved gas leaves only via their respective tubes 50, 52 and 54.

In some embodiments, due to the brittle nature of the ceramic membranes and their substrates 102 and 106, supports are provided (not shown) on the hydrogen output side of the ceramic membranes and substrates 102 and 106. These support structures are preferably fabricated from Stabilized Austenetic 321 or 347 stainless steel and take any suitable form including wires, rods, edge-wise lattice structures, struts, honeycombs, etc. Other high temperature materials may be used that are suitable for corrosive resistant operation at 800° C. These supports must properly support the ceramic membranes 102 and 106 while covering a minimal surface area of the ceramic membranes 102 and 106 to avoid blocking the flow of evolved hydrogen gas.

Figure 6:
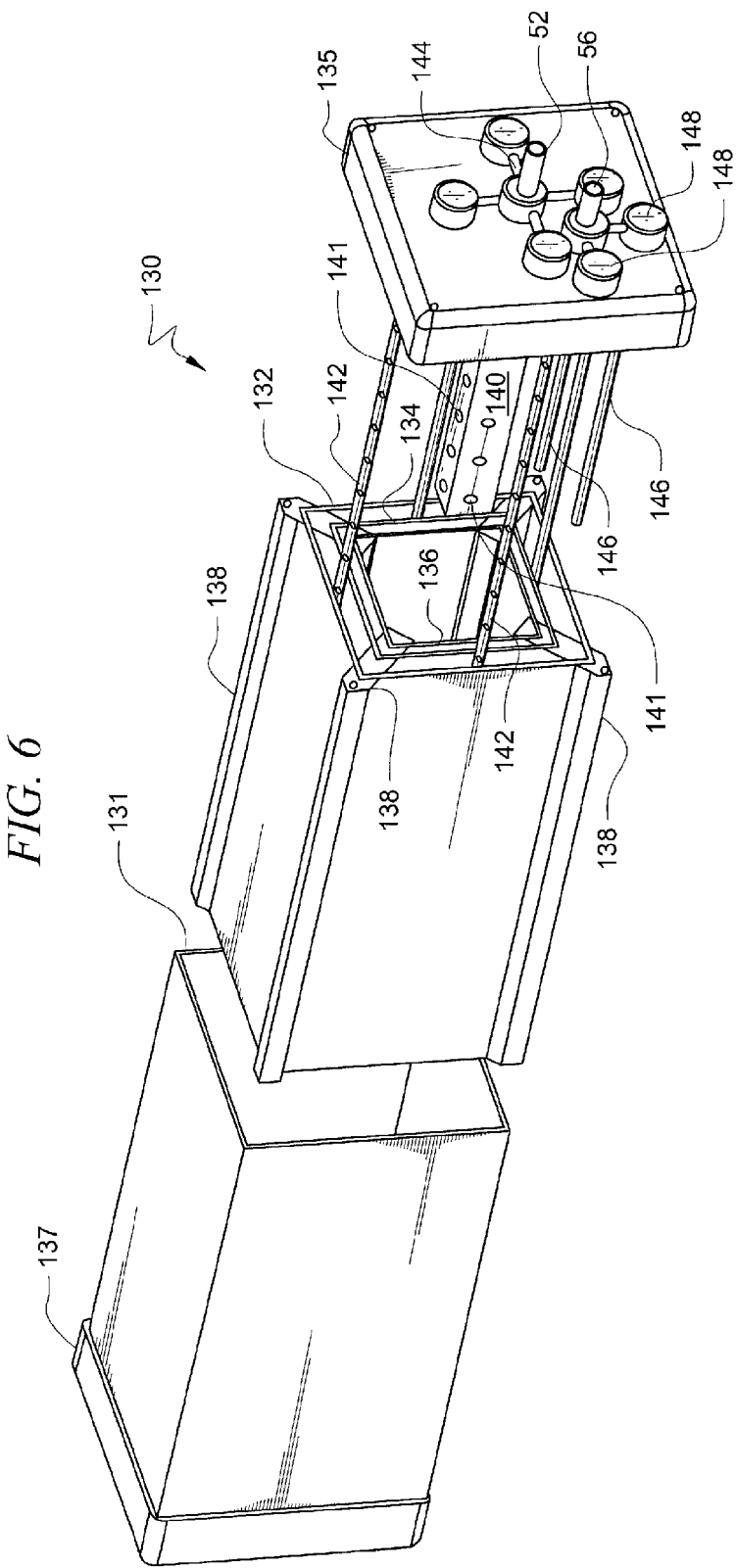
FIG. 6 illustrates an exploded isometric view of the oxygen gas production chambers of the second and most preferred embodiment of the present invention.
Figure 7:
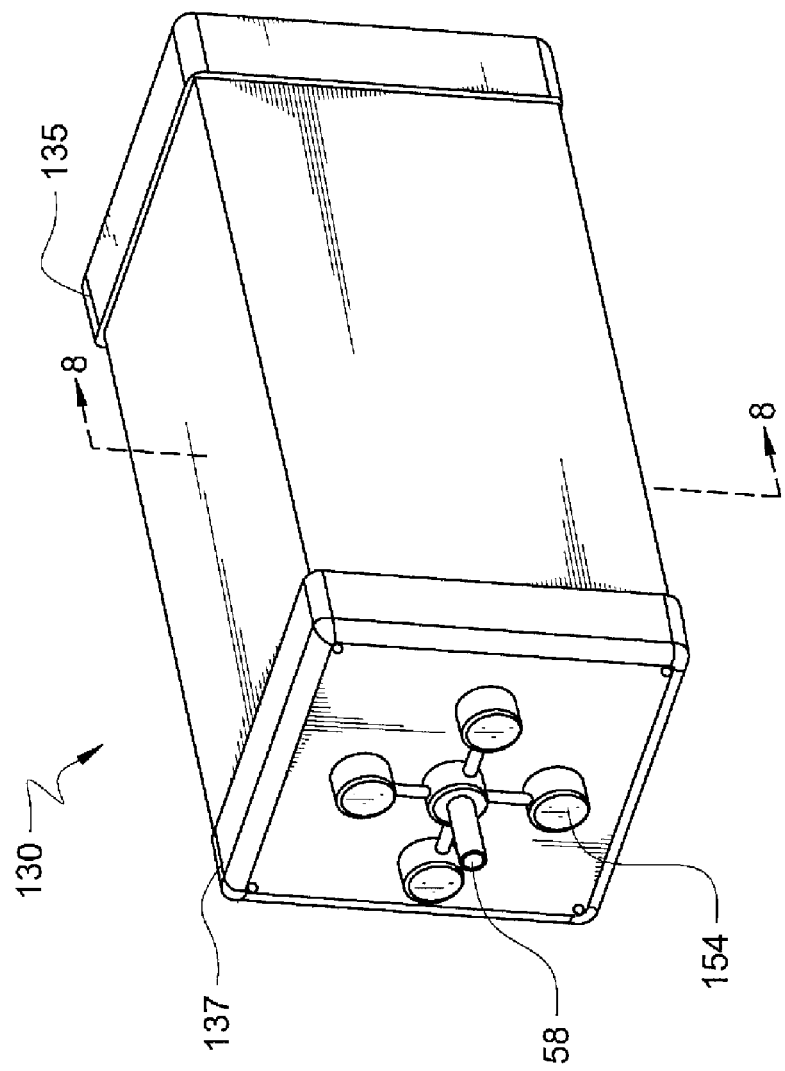
FIG. 7 illustrates an isometric view of the bottom of the oxygen gas production chambers of the second and most preferred embodiment of the present invention.

FIGS. 6 and 7

Internal Construction of Oxygen Catalytic Cells

Referring to FIGS. 6 and 7, an exploded view of the internal construction of the oxygen gas production catalytic cells 130 of all embodiments of the present invention is shown. The shape and configuration of the oxygen catalytic converter cells 130 may be variable based upon the desired rate of oxygen production, available space and manufacturing requirements. The shape, size, layering, support structures and flow paths as shown are an exemplary description of the oxygen catalytic converter cells 130.

In some embodiments, the oxygen catalytic cells 130 are mechanically identical to the hydrogen catalytic cells 100 (see FIGS. 4 and 5) with the exception that catalytic cells for hydrogen production have ambipolar cermet membranes 102 and 106 chemically suited for hydrogen production. By contrast, the catalytic cells for oxygen production 130 are disposed with ambipolar cermet membranes 132 and 136 chemically suited for oxygen production.

Within the preferred embodiments the catalytic cell assemblies are fabricated from Stabilized Austenetic 321 or 347 stainless steel. Other high temperature materials may be used that are suitable for corrosive resistant operation at 800° C.

The oxygen production system uses superheated steam to produce oxygen by decomposition of water (as superheated steam) using catalytic chemical membranes. The catalytic membranes for oxygen production are the subject of U.S. Pat. No. 6,468,499 B1, "A Method of Generating Hydrogen by Catalytic Decomposition of Water", U. Balachandran, et al, and U.S. Pat. No. 6,726,893 B2, "Hydrogen Production by High Temperature Water Splitting using Electron-Conducting Membranes", T. H. Lee, et al, both of which are incorporated by reference.

The flow of steam is controlled by output modulation valve 46 and is distributed via tube 52 to the input manifold 148 of the oxygen catalytic converter cells 130. The thermal content of the superheated steam provides the energy for the endothermic decomposition process and the superheated steam provides the constituent diatomic oxygen gas.

Within the present invention the steam enters all four cells 130 in parallel. As an example of preferred construction one such cell is depicted here in FIG. 6. In each cell, the steam is directed to wash over ceramic membranes and their substrates 132 and 136, disposed in an orthogonal spatial configuration with 4 inner membranes with substrates 136 and 4 outer membranes and substrates 132 forming concentric geometric prism structures. Such a mechanical structure maximizes the surface area within a given overall enclosed volume. Shown is but one possible configuration, among others, to maximize surface area versus contained volume.

Superheated steam dispenser tubes are arranged to collectively and exhaustively spray approximately and preferably 5,000 cm² of surface area of membrane per cell. The inner dispenser tube 140 is disposed with dispenser holes 141 on each of four sides. The steam is directed to each of the four membranes 136 by the dispenser tube 140. The outer dispenser tubes 142 are disposed with dispenser holes 141 on each of four separate tubes. The steam is directed to each of the four membranes 132 by one dispenser tube 142 per each of four outer membranes 132.

It is preferred that the steam be directed from the 4 outer dispenser tubes at the outer set of ceramic membranes 132 at an angle of approximately 70° to affect maximum turbulence and surface coverage to maximize oxygen production. The 70° hole offset pattern is not visible in this view, but can be seen in the cross section depicted in FIG. 8.

As a consequence of exposure to turbulent superheated steam at 800° C., the membranes cause the constituent diatomic oxygen gas to be evolved on the far side of all the membrane surfaces 136 and 132. The evolved gas collects in a closed gas containment chamber bounded by enclosure walls 134 for the inner chamber and enclosure walls 131 for the outer gas collection chamber. The oxygen gas produced and collected in the gas containment chambers leaves the inner and outer chambers by gas port tubes 146. The steam input port 52 and inlet manifold 144 enter the cell 130 via the end cap 105. The gas output port 56 with inner and outer outlet manifold 148 exit the cell via end plate 135.

In the preferred embodiments of the present invention catalytic banks of four oxygen catalytic converters 130 are incorporated and collectively contain 20,000 cm² of surface area of catalytic membranes. Any reference to ceramic, chemical, catalytic membranes shall include the membranes and the membrane substrates. Each catalytic cell will generate 150 liters of $O_2$ per minute and a bank of 4 cells with an active membrane area of 20,000 cm² will generate 600 liters of oxygen per minute.

In FIG. 7, a bottom view of a catalytic cell 130 is shown. The unreacted steam exits the cells 130 via the outlet manifold 154 and steam output port tube 58 of each respective cell 130. Shown in this view is the bottom cap 137 and outer gas containment wall 131. Housing 131 also forms the external cover for the whole assembly.

FIG. 8

Cross-Section of the Gas Production Catalytic Cells

Figure 8:
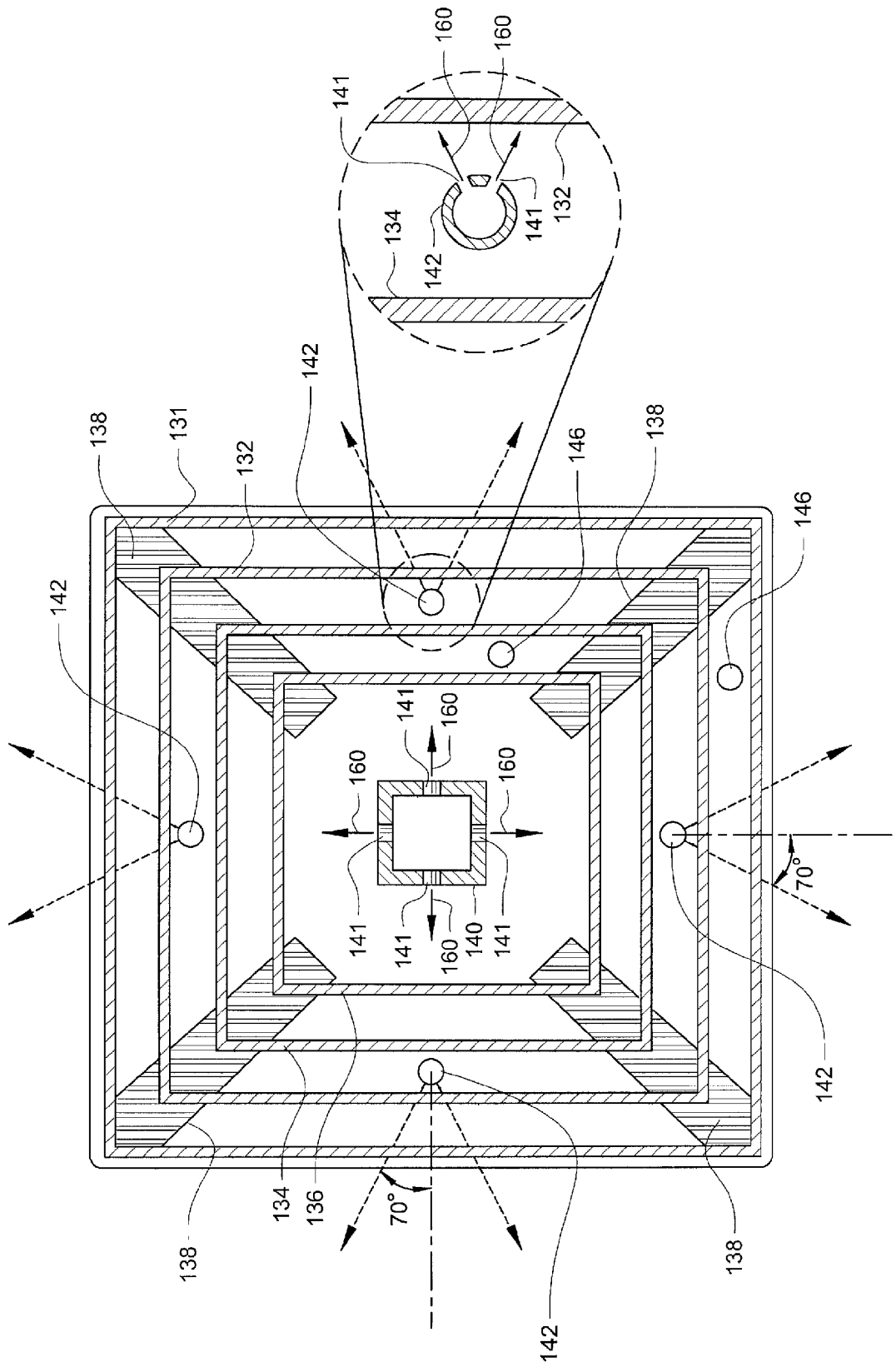
FIG. 8 illustrates a cross-sectional view of the gas production chambers of the all embodiments of the present invention along cut line 8-8 of FIG. 7.

Referring to FIG. 8, a cross-sectional view of the gas production chambers of all embodiments of the present invention along cut line 8-8 of FIG. 7 is shown. Although shown and numbered with respect to the oxygen catalytic converters 130, the same cross section applies to the hydrogen catalytic converters 100 should they posses the same mechanical and physical design.

In this, the flow of steam 160 out of holes 141 in the central steam pipe 140 strikes the four inner ceramic membranes 136, thereby causing oxygen molecules to be dissociated by the membranes. The evolved gas collects in the gas collection chamber bounded by the inner ceramic membrane 136 and the inner wall 134. The inner wall is fabricated from Stabilized Austenetic 321 or 347 stainless steel. Other high temperature materials are used that are suitable for corrosive resistant operation at 800° C.

Simultaneously, steam 160 flows out of holes 141 in the four distributed steam dispenser pipes 142 and strikes the outer four ceramic membranes 132, thereby causing oxygen molecules to be dissociated by the membranes and the evolved gas collects in the gas collection chamber bounded in the cavity between the outer ceramic membrane 132 and the outer wall 131.

It is preferred that the steam be dispersed at an angle between sets of 2 dispensing holes 141 to cover a greater area of the outer ceramic membrane 132. This hole pattern is only visible in the cross section view of FIG. 8. The outer wall 131 is also preferably fabricated from Stabilized Austenetic 321 or 347 stainless steel. Other high temperature materials are used that are suitable for corrosive resistant operation at 800° C.

Oxygen is collected in the gas collection chamber bounded by the outer ceramic membrane 132 and the outer wall 131.and in the gas collection chamber bounded by the inner ceramic membrane 136 and the inner wall 134. The oxygen produced is removed from the two gas collection chambers by two oxygen collection tubes 146. The two collection tubes 146 are later conjoined by out flow manifold 148 and leaves the assembly via gas output port 56 as part of the end cap 135 visible in FIG. 6.

The ceramic membranes and their substrates are supported and sealed by supports 138, which maintain spacing and provide support for membranes 132 and 136. In some embodiments (not shown), a support structure is mounted behind the ceramic membranes and their substrates 132 and 136. This support structure, which can take many forms, is preferably fabricated from Stabilized Austenetic 321 or 347 stainless steel. Other high temperature materials are used that are suitable for corrosive resistant operation at 800° C. The support structures are preferably shaped to provide maximum support while limiting surface area contact with all the ceramic membranes 132 and 136, thereby maximizing the production and flow of oxygen.

FIG. 9

Electrical Power Production and Mass Flow

Referring to FIG. 9, a schematic view of the electrical power production of the second embodiment of the present invention is shown including the cascade and recirculation of the catalytic cell banks 100 for the generation of hydrogen and cell banks 130 for the generation of oxygen. This drawing depicts only one processing loop to highlight the basic hydrogen and oxygen production process and its attendant mass flow. The second processing loop in a nested pair is intentionally left out of FIG. 9. Both nested processing loops that compose the hydrogen and oxygen production process and all of the attendant mass flow rates are illustrated in FIG. 10.

Relative to FIG. 9, in this example, electric heater 12 heats a preferred initial water level of 440 ml (24.44 moles) in boiler 10 to a temperature of approximately 800° C. Superheated steam leaves the boiler at about 200 PSI and enters pressure regulator 44.The superheated steam is dropped in pressure from 200 PSI to a range of 60 to 100 PSI by the pressure regulator 44. The mass flow of the superheated steam leaving pressure regulator 44 is equal to or greater than approximately 960 grams per minute. This mass flow rate is required for the production of sufficient quantities of hydrogen and oxygen. The superheated steam is delivered to the catalytic cell bank 100 via input port 50, where it washes over hydrogen specific ceramic membranes 102 and 106 and leaves the hydrogen catalytic bank 100 through a steam output port 52 on the bottom of the hydrogen cells visible in FIG. 5.

At the output port 52 of the hydrogen cells, the fluid stream consists of approximately 480 gm per minute of unreacted steam plus approximately 427 gm per minute of free oxygen gas that is now commingled with the steam because the hydrogen catalytic cell bank has removed a portion of the $H_2$ from the superheated steam input stream.

The unreacted steam and $O_2$ (collectively 907 gm per minute) enters the oxygen catalytic cell bank 130, via the steam input ports which receive their input flow from the steam output port 52 of the hydrogen catalytic cell bank 100.

The unreacted steam and commingled oxygen mixture enters the oxygen catalytic cell bank, where it washes over oxygen specific ceramic membranes 132 and 136. Since the input stream is rich in free $O_2$, the $O_2$ catalytic cells 130 will readily capture the free, suspended $O_2$ gas at a rate of approximately 341 gm per minute and continue to dissociate much of the remaining steam into $O_2$ gas at a rate of approximately 214 gm per minute. Consequently, the total rate of oxygen production, the sum of captured and dissociated $O_2$, is approximately 555 gm per minute.

Some free hydrogen gas is now commingled with the unreacted steam because the catalytic cell bank 130 has removed some $O_2$. The unreacted steam and the commingled hydrogen leaves the oxygen catalytic cell bank 130 through the steam output port 58 at the bottom of cell bank 130. The mass flow leaving the steam output port of oxygen cell bank is made up of 240 gm per minute of unreacted steam, 85 gm per minute of free oxygen, and 27 gm per minute of free hydrogen gas.

Collectively the mass flow returning to the boiler 10 from the output port of cell bank 130 is 352 gm per minute. This mass flow from the output port 58 at the bottom of oxygen catalytic cell bank 130 is directed back to the input port of circulating pump 60. The mass flow at the output port of circulating pump 60 is higher in pressure at about 210 PSI and is fed back to the boiler 10 where heat is added, the cycle is complete and the process continues.

Note that the mass flow returning to the boiler 10 of 352 gm per minute is less than the original output of the boiler of 960 gm per minute by the amount of 608 gm per minute. The mass flow in the circulating loop is lower because 555 gm of oxygen and 53 gm of hydrogen were removed from the circulation loop by dissociation of water (as steam). A second processing loop has been intentionally left out in order to better illustrate the catalytic process for gas production. In this configuration, mass is leaving the circulation loop as steam is being dissociated into the constituent hydrogen and oxygen gases, which are directed to the fuel cell 80. Eventually, as circulation continues, the mass and the pressure in the basic circulation loop will fall to zero and the process will stop. How to continue the process will be illustrated in FIG. 10.

The evolved hydrogen of 53 gm per minute from the hydrogen catalytic cell banks 100 leaves the cell banks via the hydrogen gas output port 54 and is fed to the fuel cell 80. The 555 gm per minute of evolved oxygen from the oxygen catalytic cell banks 130 leaves the cell banks via the oxygen gas output port 56 and is also fed to the fuel cell 80. This is enough hydrogen and oxygen for the fuel cell to generate 50,000 watts of electrical power, a very significant quantity of heat and 374 gm per minute of water (via steam at 800° C.).

FIG. 10

Electrical Power Production and Dual Loop Mass Flow

Referring to FIG. 10, a schematic view of the electrical power production and two nested process loops, with their attendant mass flow rates, as incorporated in the second embodiment of the present invention is shown. This process is similar to that of FIG. 9, relative to the basic gas production process. The exception in this view is that additional heat sources and regenerated water are returned to the boiler 10 by the use of a second, closed processing loop. The mass flow rates of the two closed processing loops may be different. Increasing or decreasing the flow rate of pump 60 and the attendant mass flow rate of the first processing loop relative to the second processing loop allows for the optimization of the evolved gas production.

The fuel cell 80 receives the dissociated hydrogen and oxygen produced by the first closed processing loop and generates electrical power and a significant quantity of heat. The fuel cell 80 also regenerates 374 gm per minute of water as steam at approximately 800° C., 222 gm per minute of unreacted oxygen and 12 gm per minute of unreacted hydrogen which leave fuel cell 80 via outflow conduit 77 visible on FIG. 2.

The 374 gm per minute of regenerated steam, 222 gm per minute of unreacted oxygen, and 12 gm per minute of unreacted hydrogen from the fuel cell 80 (collectively a mass flow of 608 gm per minute) is fed back in a second processing loop to the circulating pump 60. It is then joined with 240 gm per minute of steam, 85 gm of oxygen and 27 gm per minute of hydrogen (collectively 352 gm per minute) from the output of the oxygen catalytic cell banks 130 in the first closed processing loop from catalytic cell output pipe 58 visible in FIG. 3. The pump 60 receives the mass flow summation from both the first and the second processing loops. The circulation pump receives a total fluid stream consisting of 614 gm per minute of unreacted steam, 307 gm per minute of unreacted oxygen and 39 gm per minute of unreacted hydrogen. The total mass flow is then 960 gm per minute into circulation pump 60.

Again, the circulating pump 60 raises the pressure of this fluid stream to 210 PSI in this example and injects it back into the boiler 10 allowing the process to continue. Reaction heat from the fuel cell 80 is introduced into the boiler 10 via the heat content of the regenerated water (as steam) and through a reaction heat exchanger 14 that thermally couples and transports fuel cell assembly heat to boiler 10. Because the endothermic heat required in the gas dissociation process is greater than the exothermic reaction heat produced by the fuel cell 80, a small amount of hydrocarbon combustion heat is provided by the ancillary heater 16 to maintain the proper system operational temperature of about 800° C. and sustain the processes. The combustion heat is provided by, preferably gasoline or diesel fuel, or any other fuel in Table 10. The process is now self-sustaining because regenerated water, previously dissociated into hydrogen and oxygen, is regenerated in the fuel cell 80, recirculated through the boiler 10 to gain additional heat and is fed forward by the second processing loop to continue the process.

If the catalytic system was open loop, or contained only the first processing loop as described and illustrated in FIG. 9, 22% of the hydrogen would be unreacted, ($U_f$=0.78), the system would not replace 22% of 482.4 ml of the water processed per minute. Only 374 ml of water per minute would be regenerated. The unreacted hydrogen and oxygen would exit the fuel cell mixed in the water vapor (as steam) and leave in the output stream of fuel cell 80 via conduit 77.

In a Dual Closed Loop Process

By contrast, since mass is conserved in a closed loop system, hydrogen, oxygen and water are not lost. Rather, the make-up of the working fluid dynamically changes in the catalytic processor mass-flow circulating loops. The hydrogen processor unit of the catalytic processor will capture and redirect, perhaps, 10% of the unreacted diatomic hydrogen (and unreacted oxygen) to the input ports of the fuel cell and more, but not all, water will be regenerated. Thus, the constituents of the working fluid in the loop always contains a mixture of $H_2O+H_2+O_2$ in a dynamic ratio. A small amount of the free $H_2$ and $O_2$ will be lost during a full shut-down procedure as the mixture is returned to the water storage tank. The very small amount of lost $H_2$ and $O_2$ will not be available to be reformed into $H_2O$ upon start up. As a result a small amount of water will be used by the system over time.

The fuel cell always regenerates most of the water that has been dissociated to liberate diatomic hydrogen and diatomic oxygen. The "Cascade and Recirculate" catalytic processor will, next in turn, always capture some of the free diatomic hydrogen or diatomic oxygen present as a mixture in the regenerated water (as steam) output by fuel cell 80.

This is a complex, related rate process, owing to the fact, that the reaction rate of the fuel cell varies based on demand, and neither the fuel cell nor the catalytic dual port processor are 100% efficient in generation of hydrogen and oxygen or the formation of water. The theoretical $H_2O$ production rate, as a function of fuel cell output, is portrayed by the equation in Table 9.

The discussion and illustration of FIG. 10 highlights the concept of the new and unique "Thermodynamic Hybrid" that is a salient feature of the present invention.

FIG. 11

Electrical Power Production and Dual Loop Mass Flow Only Hydrogen Production

Referring to FIG. 11, a schematic view of the electrical power production of the first embodiment of the present invention is shown including the cascade and recirculation of the catalytic cell banks 100 for the generation of only hydrogen. Electric heater 12 heats an initial 440 ml (24.4 moles) of water in boiler 10 to a temperature of approximately 800° C. Superheated steam leaves the boiler at about 200 PSI and enters pressure regulator 44. The superheated steam is dropped in pressure from 200 PSI to a range of between 60 and 100 PSI by the pressure regulator 44. The mass flow of the superheated steam leaving pressure regulator 44 is equal to or greater than approximately 960 grams per minute. This mass flow rate is required for the production of sufficient quantities of hydrogen.

The superheated steam is delivered to the hydrogen catalytic cell bank 100 via input ports 50 visible on FIG. 1, where it washes over hydrogen specific ceramic membranes 102 and 106 and leaves the hydrogen catalytic bank 100 through a steam output port 52 on the bottom of the hydrogen catalytic cells visible in FIG. 5.

At the output port 52 of the hydrogen cells, the fluid stream consists of approximately 480 gm per minute unreacted steam plus approximately 427 gm per minute of free oxygen gas, which is now commingled with the steam because the hydrogen catalytic cell bank 100 has removed a portion of the $H_2$ from the superheated steam.

The unreacted steam and $O_2$ (collectively 907 gm per minute) enters the input port of circulation pump 60 from the first circulation loop. The evolved hydrogen from the hydrogen catalytic cell banks 100 leaves the cell banks via the hydrogen gas output port 54 at a rate of approximately 53 gm per minute and is fed to the fuel cell 80. Air at 1 atmosphere is drawn into air intake manifold 71 and delivered to the input port of pump (blower) 72. Blower 72 feeds $O_2$ in air through the $O_2$ input port of the high temperature fuel cell 80. A volume flow of air, five-fold the $O_2$ volume requirement must be delivered because air is approximately 20% $O_2$. The amount of oxygen in air that is required, in molar units, is determined by the equation of Table 7.

TABLE 7

Molar Oxygen In Air Consumption Rate

| | |
|---|---|
| $E_{out} = 220$ | System output voltage, volts |
| $F = 96485$ | Faraday's constant |
| $I_{out} = 228$ | System output current, Amps |
| $t_{FC} = 60$ | Fuel cell running reaction time, seconds |
| $Z_e = 4$ | Excess electrons, oxygen |
| $E_C = 0.75$ | Cell voltage, volts |
| $M_o$ | Number of Moles, oxygen |
| $U_F = 0.50$ | Fuel reaction utilization constant |

$$M_o = \frac{I_{out} * E_{out} * t_{FC}}{F * E_C * Z_e}$$

$M_o = 10.398$  Moles of oxygen reacted $$O_2 = \frac{M_o * 5.0}{U_F}$$

$O_2$ (in air) = 103.980  Moles of air required per minute

The fuel cell 80 receives the dissociated hydrogen produced by the first closed processing loop and atmospheric oxygen and generates electrical power and a significant quantity of heat. The fuel cell 80 also regenerates 374 gm per minute of water (as steam) at approximately 800° C., 222 gm per minute of unreacted oxygen and 12 gm per minute of unreacted hydrogen.

The 374 gm per minute of regenerated steam, 222 gm per minute of unreacted oxygen, and 12 gm per minute of unreacted hydrogen from the fuel cell 80 (collectively a mass flow of 608 gm per minute) is fed back from outflow conduit 77 (visible in FIG. 2) of fuel cell 80 in a second processing loop to the circulating pump 60 to be joined with 480 gm per minute of unreacted steam and 427 gm per minute of free oxygen, (collectively 907 gm per minute) in the first closed processing loop.

The circulating pump 60 raises the pressure to 10 PSI above the pressure of boiler 10 and moves the circulating dynamic fluid mixture consisting of steam, free $O_2$, unreacted $O_2$ and unreacted $H_2$ from the first and second processing loops, returning the dynamic fluid mixture to the boiler 10.

The circulation pump 60 receives a fluid stream consisting of 854 gm per minute of unreacted steam, 649 gm per minute of unreacted oxygen and 12 gm per minute of unreacted hydrogen. The total mass flow is then 1,515 gm per minute into circulation pump 60. Notice that 555 gm per minute of the input to the circulation pump 60 is atmospheric oxygen that was not derived from the initial fluid stream of 960 gm per minute out of regulator 44.

With the return of the fluid stream to the boiler the process will continue given enough energy as heat to maintain the proper boiler temperature. Reaction heat from the fuel cell 80 is introduced into the boiler 10 via the heat content of the regenerated water (as steam) and through a reaction heat exchanger 14 that thermally couples and transports fuel cell assembly heat to boiler 10. Because the endothermic heat required in the gas dissociation process is greater than the exothermic reaction heat produced by the fuel cell 80, a small amount of hydrocarbon combustion heat provided by the ancillary heater 16 is required to sustain the processes and maintain the proper system operational temperature of about 800° C. The preferred fuel for embodiments 1 and 2 is either gasoline or diesel fuel, although any fuel from Table 10 could be used.

TABLE 10

Properties of Some Common Fuels

| Fuel | $E_e$ | $F_c$ | $E_f$ | $r_m$ | L | T |
|---|---|---|---|---|---|---|
| Gasoline ($C_8H_{17}$) | 18,900 | 0.067 | 95.6 | 1.06 | 130 | 37 |
| "Diesel Oil" ($C_{12}H_{26}$) | 18,200 | 0.067 | 93.0 | 1.06 | 90 | 25 |
| Normal Heptane, $C_7H_{16}$ | 19,320 | 0.066 | 96.0 | 1.06 | 140 | 39 |
| Iso-Octane, $C_8H_{18}$ | 19,160 | 0.066 | 95.2 | 1.06 | 130 | 37 |
| Benzene, $C_6H_6$ | 17,330 | 0.076 | 97.1 | 1.01 | 170 | 54 |
| Ethyl Alcohol, $C_2H_5(OH)$ | 11,520 | 0.111 | 91.4 | 1.06 | 370 | 170 |
| Methyl Alcohol, $CH_3(OH)$ | 8,560 | 0.155 | 88.8 | 1.06 | 470 | 300 |
| Hydrogen, $H_2$ | 51,590 | 0.029 | 81.1 | 0.85 | ... | ... |
| Carbon Monoxide, CO | 4,350 | 0.407 | 94.9 | 0.85 | ... | ... |
| Methane, $CH_4$ | 21,510 | 0.058 | 86.4 | 1.00 | ... | ... |
| Propane, $C_3H_8$ | 20,500 | 0.064 | 96.3 | 1.04 | ... | ... |
| Butane, $C_4H_{10}$ | 20,000 | 0.065 | 96.3 | 1.05 | ... | ... |
| Acetylene, $C_2H_2$ | 20,700 | 0.076 | 110.0 | 0.96 | ... | ... |
| Carbon | 14,120 | 0.087 | 94.0 | 1.00 | ... | ... |

$E_e$ = lower heat of combustion, B.t.u. per lb.
$F_c$ = "chemically correct" fuel-air ratio.
$E_f$ = lower heat of combustion of a cubic foot of correct mixture at 60° F., 14.7 lbs. per sq. in., B.t.u.
$r_m$ = ratio of number of molecules after and before combustion, chemically correct mixture.
L = latent heat of evaporation at 14.7 lb./sq.in., 60° F., B.t.u. per lb.
T = approximate temperature drop due to complete evaporation of fuel in chemically correct mixture, degrees F.

FIG. 12

Microprocessor and Controller

Referring now to FIG. 12, a schematic view of an exemplary controller of all embodiments of the present invention is shown. The controller 200 is shown for completeness and is a simplified example of a typical processor-based controller that is used to control systems such as disclosed here within. The controller 200 has a processor 210 and associated memory 220 and program storage 225, in this example, Flash memory. This is an exemplary system and any suitable processor, memory and persistent storage can be substituted including micro-controllers such as the Intel® 80C51, processors such as the Intel® Pentium IV, memory such as SDRAM and DDR and persistent storage such as ROM, EPROM, hard disks, etc. The operating program and data parameters are typically stored in the persistent storage 225 and are typically loaded into the memory 220 and executed by the processor 210. A system bus 230 interfaces the processor to peripheral devices as discussed below.

The processor displays information, alerts, prompts, etc., on a display 260. In some embodiments, the display 260 is a graphics display. In some embodiments, the display 260 is an automobile dash-board display. In other embodiments, the display is a numeric display, alpha-numeric display, set of lights or any combination of such. Control of the system is initiated by control inputs 270. In some embodiments, the control inputs 270 include a keyboard. In other embodiments, the control inputs 270 includes push buttons, switches, potentiometers and digital potentiometers, etc. In some automotive embodiments, the control inputs 270 include dash-board switches, accelerator and brake potentiometers or the like.

The controller 200 has various analog or digital outputs and inputs to control and monitor the operation of the system of the present invention. For example, there are control valve outputs 240 to control the valves of the system, pump control outputs 245 to control the pumps of the system and sensor inputs 250 to monitor pressure, temperature and working levels within the system. Additionally, a control output 255 for enabling the electric heater power relay switch 89 is provided. Other inputs and outputs are possible without departing from the present invention.

Operational Modes

The controller typically operates under seven primary and two secondary operational modes. The primary operational modes are Cold Start, Run, Auto-Charge When Parked, Shut Down, Anti-Freeze Shut Down, Defrost, and Safety Override. There are two secondary modes. Start Electric Heating and Start Combustion Heating are secondary modes within the primary modes of Cold Start and Run.

The controller 200 manipulates its outputs 240, 245, 255 to activate all valves and pumps in a particular sequence unique for each operational mode. The following control sequences are presented as an example to illustrate the system operation by view of the control sequence of the elements of the apparatus.

Cold Start:
  Battery switch 89 is open
  Output modulation valve 46 is closed
  Steam return valve 61 is closed
  Regenerated $H_2O$ return valve 79 is closed
  Feed water valve 26 is closed
  Feed water return valve 28 is closed
  Emergency vent valve 36 is closed
  Preheater heat transfer valve 24 is open
  Pressure sensor 92 indicates 0 PSIG
  Temperature sensor 93 indicates ambient
  Open feed water valve 26
  Start feed water pump 20
  Transfer 240 ml to 480 ml from water storage tank 18, through preheater 22, through valve 26 to boiler 10 until level sensor 94 indicates 240 ml-500 ml (440 ml typical)

Start Electric Heating:
  Set battery switch 89 to "ON"
  Start fuel cell preheater 73, boiler 10 begins to rise in pressure and temperature.
  In approximately seven minutes, pressure sensor 92 will indicate 200 PSIG and temperature sensor 93 will read approximately 800° C.
  Assume, the status of the charge regulator reads 70% (e.g., charge required).
  Set output modulation valve 46 to open.
  Open catalytic steam return valve 61 and start circulation pump 60. Steam flows through pressure regulator 44 through output modulation valve 46 and into the $H_2$ decomposition cells 100. (and alternately into the $O_2$ decomposition cells 130)
  Hydrogen is evolved, collected and flows through secondary thermal control 55 and into hydrogen fuel pump 62 then into hydrogen pressure regulator 64.
  Alternately oxygen is evolved, collected and flows through secondary thermal control 65 and into oxygen fuel pump 72 then into oxygen pressure regulator 74.
  Hydrogen is delivered from pressure regulator 64 to the anode 81 of the fuel cell 80.
  $O_2$ in air blower 72 (or pure $O_2$ pump 72) is turned on.
  $O_2$ in air is drawn into air intake 71 through pump 72 and into the cathode port 83 of fuel cell 80. (Alternately pure $O_2$ is fed to cathode port 83 from regulator 74.)

The fuel cell 80 delivers DC power through charge regulator 84 and into battery 85 and battery 85 charges.

The regenerated H$_2$O return valve 61 is opened

The H$_2$O return pump 62 is started

Regenerated H$_2$O is returned to the boiler 10 through the pump 62 and valve 61.

When charge regulator 84 indicates 100% charge, the output modulation valve 46 is turned off.

Run:

Catalytic steam return valve 61 remains open and circulating pump 60 remains on Battery switch 89 is turned off The preheater 73 is turned off The vehicle traction motor 88 is powered by the battery 85 through inverter 86

As the battery 85 discharges, the charge regulator 84 will indicate the present charge to the controller 200

When the charge regulator detects a discharge of approximately 20%, the output modulation valve 46 is opened so that more steam will be delivered to the catalytic cell banks 100 creating more hydrogen for fuel cell 80.

DC power will be delivered from the fuel cell 80 through the charge regulator 84 maintaining the battery 85 in a state of full charge.

Additional regenerated H$_2$O will exit fuel cell 80 into pump 78 through open valve 79 and back into the boiler 10

The process continues and repeats so that fuel cell 80 is supplied with hydrogen as needed and charge regulator 84 maintains battery 85 in nearly a full state of charge. The various pumps and valves for this process are controlled by the controller 200.

Start Combustion Heat as Required

Start hydrocarbon fuel pump 42.

Hydrocarbon fuel (preferably unleaded gasoline or diesel fuel) will be delivered to combustion heater 14. Ignition turn-on and turn-off of combustion heater 14 is controlled by the controller 200 as required to maintain boiler temperature at 800° C.

Auto-Charge when Parked:

If the vehicle is parked, and the controller 200 detects, via the status of charge regulator 84, that battery 85 is less than fully charged (by some amount such as 20%), the auto charge mode will be enacted. This mode can be locked out by the operator via operator inputs to the controller 200.

If the vehicle is not moving; the vehicle is in "park"; and the state of charge of the battery 85 is less than 100%, continue "Run" sequence until the charge regulator 84 reports full charge.

Once fully charged, initiate "Shut Down" mode.

Shut Down:

Output modulation valve 46 is closed.

Catalytic steam return pump 60 continues to run and removes all steam from the catalytic cells 100

Steam from the catalytic cell 100 banks returns to boiler 10.

Regenerated H$_2$O feed return pump 78 remains on.

Regenerated H$_2$O return valve 79 remains open.

All H$_2$O as water or steam is withdrawn from fuel cell 80 and returned to the boiler 10 via the pump 78, through the valve 79 and into the boiler 10.

The hydrocarbon fuel pump 42 is turned off.

Anti-Freeze Shutdown

The water storage tank is equipped with features that allow freezing water to expand without catastrophic failure of the water tank structure. Water storage tank 18 is the only system component so equipped with this feature. One such tank with these features is a modified Wellmate model WM-4 with external heater. After the control sequence for normal shut down is complete the following additional control sequences are required to prevent catastrophic freezing of water in system elements:

Feed water return valve 26 is opened.

Condenser fan 31 is turned on, blowing air across the condenser 32.

Feed water return pump 34 is started.

Feed water valve 26 is closed.

Heat transfer valve 24 is closed.

Water and/or steam will leave boiler 10 through open return valve 28 and through the pressure regulator 30 where the pressure will fall from 200 PSIG or less to a pressure less than 30 PSIG.

Steam or water flows through condenser 32 at reduced pressure and is transported via pump 34 into the water storage tank 18.

Defrost:

If the controller 200 detects an ambient temperature below 5° C. via a sensor input, it will be assumed that the water in storage tank 18 is frozen.

Prior to initiating a cold start sequence, the water storage tank defrost heater 19 is activated and powered by the battery 85. The defrost heater remains on for enough time to melt any ice in the water storage tank 18, for example, 15 minutes, and is then automatically deactivated by the controller 200.

Safety Override:

This system is equipped with a safety override mode. In the event that boiler-pressure reservoir 10 reaches a pressure of 310 PSIG or a temperature in excess of 860° C.:

The steam safety vent valve 36 is opened passing excess steam pressure though an outlet pipe 35 and out through an exhaust vent 38.

The output modulation valve 46 is closed.

The hydrocarbon fuel pump 42 is turned off.

The fuel cell fan 87 is turned on.

The condenser fan 31 is turned on.

The feed water return valve 28 is opened and the feed water return pump 34 is started.

The system will remain in this mode until the pressure drops below 200 PSIG and drops below a temperature of 700° C.

Optimization of Load Parameters

The exemplary fuel cell 80 is a typical fuel cell as known in the industry having an anode 81, electrolyte 82 and cathode 83. Any voltage source, whether it is electromagnetic or electrochemical in origin will contain an internal impedance. Fuel cells are electrochemical and have an internal impedance. It is this impedance that causes internal losses that give rise to a voltage drop under load. As a result, the open circuit voltage of the fuel cell 80 is higher than the loaded output voltage.

The internal source impedance of a fuel cell 80 can be determined by laboratory testing using the equations shown in Table 8. Once the internal source impedance is determined, it is possible to maximize the electrical power transfer from the electrochemical fuel cell to the purely electrical load.

The advantage of adjusting the load impedance to match the internal source impedance of the fuel cell is demonstrated in the equation of Table 8. This equation uses a hypothetical fuel cell with an open circuit voltage of 105 volts and a loaded fuel cell stack voltage of 75 volts with an output current of 50 amperes. The beginning test load for this data was equal to 1.50 ohms. The internal source impedance ($Z_{INT}$) for this hypothetical case was determined to be equal to 0.60 ohms.

The power delivered to the 1.5 ohm load with a current of 50 amps and an output voltage of 75 volts is 3,750 watts. The power delivered to a load equal to the internal source impedance is 4,594 watts. This is the maximum power transfer possible for this hypothetical fuel cell stack and it demonstrates an increase in output power of 18.4%.

Proof of the maximum power transfer theorem is based on solving the output power equation for the load resistance and taking the first derivative of that equation and setting it equal to 0. Alternately, the equation for power output can be solved iteratively for various values of load resistance.

The equation of Table 8 shows the results from loads ranging from R equal to 0.30 to R equal to 1.50. Calculations result in powers ranging from 3,750 watts to 4,594 watts for R equal to values from 0.30 ohms to 1.50 ohms, with a maximum value of power of 4,594 watts resulting from a load value of 0.60 ohms.

Optimization of the fuel cell load in the present invention is accomplished by obtaining the internal impedance of fuel cell 80 by testing and then designing the input impedance of charge regulator 84 to match. In a stationary application the input impedance of the AC inverter is designed to match the internal impedance of fuel cell 80.

The electrical system disclosed in the present invention is designed and capable of generating 50,000 watts. However, if the practice of matching the load parameters to the output of the fuel cell 80 in accordance with the above techniques is not incorporated, the actual power delivered to the load will be greatly reduced. If losses, as demonstrated in the above example, were present, only 41,000 watts would be delivered to the load.

Fuel Cells Generated Water

During the operation of the fuel cell 80, it chemically regenerates $H_2O$ using the hydrogen fuel and oxygen decomposed from water. The water that is regenerated by the fuel cell is transferred via fuel cell outflow conduit 77 to water return pump 78. The water return pump 78, causes the regenerated water, as steam, to be increased in pressure by 10 PSI greater than the boiler 10 pressure and the regenerated water is returned to the boiler 10 after passing through regenerated water boiler input valve 79. The system regenerates most of the water that is used in its fuel generation processes. Most of the reaction heat generated by the recombination of hydrogen and oxygen (an exothermic chemical process) is returned to the boiler 10. Most of the heat is conveyed via the energy content of superheated steam. Additional heat from the cooling of the fuel cell 80 is transferred via a thermal transfer means 76 and reaction heat exchanger 16 as shown in FIG. 2. The equation of Table 9 computes the amount of water, as steam, that is regenerated as a function of time and desired power level.

TABLE 8

Optimization of Load Parameters for Maximum Electrical Power Transfer $V_{oc}$ = 105     Fuel Cell Open Circuit Voltage, Volts
$V_{OUT}$ = 75     Fuel Cell Voltage Under Test Load, Volts
$I_{OUT}$ = 50     Fuel Cell Loaded Output Current, Amps $$Z_{INT} = \frac{V_{oc} - V_{OUT}}{I_{OUT}}$$

$$Z_{INT} = 0.60$$

$$R_{LOAD} = \frac{V_{OUT}}{I_{OUT}}$$

$R_{LOAD}$ = 1.50     Beginning Test Case, Ohms

TABLE 8-continued

Optimization of Load Parameters for Maximum Electrical Power Transfer $R_{LOADX}$ = 0.60     Output Load, Ohms $$I_{OUTX} = \frac{V_{oc}}{(Z_{INT} + R_{LOADX})} \text{ I out for any Load X}$$

$$V_{OUTX} = V_{OC} - [Z_{INT} * (I_{OUTX})] \text{ V out for any Load X}$$

$V_{OUTX}$ = 52.5 Volts
$I_{OUTX}$ = 87.5 Amps
$W_{OUT} = V_{OUTX} * I_{OUTX}$     Watts out for any Load X
$W_{OUT} = 4.594 * 10^3$     Computed Watts Out
4,083 Watts for R = 0.30
4,594 Watts for R = 0.60     Maximum Power
4,410 Watts for R = 0.90
4,083 Watts for R = 1.20
3,750 Watts for R = 1.50

Note:
4,594 watts for R = 0.60 is 18.4% higher than 3,750 watts for R = 1.50

TABLE 9

Solid Oxide Fuel Cell Chemical Reactions

Fuel Cell Production of Electrical Energy $H_2$ IN $\longrightarrow$     $\longrightarrow H_2O$ Output ANODE $2H_2 + 2O^= \longrightarrow 2H_2O + 4e^-$ CATHODE $O_2 + 4e^- \longrightarrow 2O^=$ $O_2$ IN $\rightarrow$     $\leftarrow$ LOAD $\leftarrow$ Fuel Cell Production of Water $I_{OUT}$ = 228     Output Current, Amps
$E_{OUT}$ = 220     Output Voltage, Volts
F = 96485     Faraday's Constant
$E_C$ = 0.75     Cell Voltage, Volts
$t_{FC}$ = 60     Fuel Cell Reaction Time, Seconds
Fuel Cell Water Production Rate (WPR)

$$WPR = \frac{E_{OUT} * I_{OUT} * t_{FC}}{2 * F * E_C}$$

WPR = 20.795     Moles per Minute
$WPR_{GMS}$ = WPR * 18     18 Grams per Mole
$WPR_{GMS}$ = 374.309     Milliliters per minute

FIG. 13

Placement in a Vehicle

Figure 13:
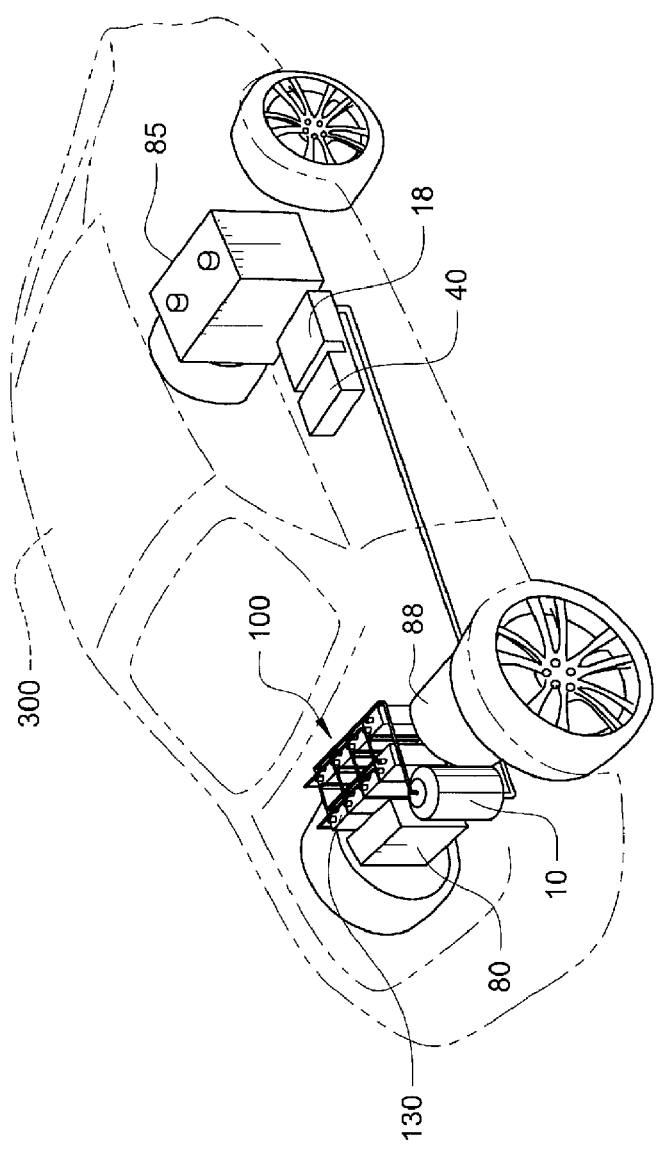
FIG. 13 is an isometric view of the placement of some main elements of the apparatus in a generic concept vehicle.

Referring to FIG. 13, an isometric view of an exemplary placement of some main elements of the apparatus in a generic concept vehicle 300 is illustrated. Fuel cell 80 is visible forward and to the left in the vehicle. To the right of the fuel cell 80 is the boiler 10. The bank of catalytic cells 130 for the generation of oxygen is disposed just behind the fuel cell 80 and boiler 10. The fuel cell 80 is about 20 inches wide, 22 inches high, and 10 inches thick. The boiler 10 has about 16 inch diameter and is about 18 inches high. The catalytic cell bank 100 for the generation of hydrogen is disposed just behind and aligned with the oxygen catalytic cell bank. The two cell banks are jointly 21 inches wide, 22 inches high, and 38 inches long.

The 67 HP electric traction motor 88 is located to the right of the catalytic converter assemblies 100 and 130 near the front left wheel. The large traction battery 85 is located in the rear, mid-chassis between the rear wheels. The water storage tank 18 is located just forward of the battery 85 and on the left side of the vehicle 300. The smaller hydrocarbon fuel tank 40 is positioned adjacent to and just forward of the water storage tank 18.

Observe that the very high temperature assemblies, the fuel cell, boiler, and catalytic cell banks are disposed in very close proximity to facilitate the coupling and exchange of thermal energy and superheated steam. The super high temperature insulation is not depicted to enhance clarity.

Appreciate that this electric vehicle is absent an internal combustion engine, associated air filter, oil pump, oil pan, oil filter, exhaust muffler and emission control system, which is not needed.

Equivalent elements can be substituted for the ones set forth above such that they perform in substantially the same manner in substantially the same way for achieving substantially the same result.

It is believed that the system and method of the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

Having thus described the invention, what is claimed for Letters Patent follows:

1. A system for producing electrical ene*rgy in a fuel cell comprising:
   a boiler containing water and having a means to create a superheated steam from the water;
   a means for delivering the superheated steam through an output modulation valve to at least one hydrogen catalytic decomposition converter, the converter containing at least one ceramic membrane;
   the ceramic membrane providing a means for decomposing the steam and generating diatomic hydrogen gas;
   a means for delivering the hydrogen gas and a supply of oxygen gas to a fuel cell;
   the fuel cell generating electrical power, heat and steam;
   a means for returning the heat and steam to the boiler;
   a means for maintaining boiler temperature and pressure at a predetermined level; and
   a controller for maintaining operation of the system.

2. The system for producing electrical energy according to claim 1, wherein the fuel cell also regenerates water which is fed to the boiler by a water feedback mechanism.

3. The system for producing electrical energy according to claim 1, wherein the supply of oxygen gas is derived from atmosphere.

4. The system for producing electrical energy according to claim 1, wherein a portion of the superheated steam commingled with unreacted oxygen molecules from the hydrogen catalytic converter is delivered to at least one oxygen catalytic decomposition converter, the converter containing at least one ceramic membrane;
   the ceramic membrane providing a means for decomposing the steam and generating the supply of oxygen gas; and
   a means for delivering the supply of oxygen gas to the fuel cell.

5. The system for producing electrical energy according to claim 1, wherein a combustion heater fueled by a combustible fuel is the means for creating the superheated steam from the water in the boiler.

6. The system for producing electrical energy according to claim 5, wherein the combustion heater fueled by a combustible fuel maintains the boiler temperature at a predetermined temperature and pressure.

7. The system for producing electrical energy according to claim 5, wherein the combustible fuel is selected from the group consisting of gasoline and diesel fuel.

8. The system for producing electrical energy according to claim 1, wherein a charge control circuit is connected to an electrical output from the fuel cell and a battery is connected to the charge control circuit.

9. The system for producing electrical energy according to claim 8, wherein the battery provides electric power to an electric heater adding heat to the boiler.

10. A method for generating electrical energy in a fuel cell, the steps comprising:
    providing a means for boiling water in a boiler to produce superheated steam;
    providing a means for delivering the superheated steam to at least one ceramic membrane mounted within a hydrogen catalytic converter to produce a hydrogen gas;
    providing a means for delivering a portion of the superheated steam to at least one oxygen catalytic converter to produce an oxygen gas;
    providing a means for feeding the hydrogen gas and oxygen gas into the fuel cell, generating electrical power, heat and water; and
    providing a means for directing the heat generated by the fuel cell to the boiler.

11. The method for generating electrical energy according to claim 10, wherein the fuel cell generates water and providing a means for feeding the water from the fuel cell to the boiler.

12. The method for generating electrical energy according to claim 10, wherein a means for burning a hydrocarbon fuel is provided to maintain a predetermined temperature and pressure in the boiler.

13. The method for generating electrical energy according to claim 11, wherein a predetermined temperature in the boiler is about 800° C.

14. The method for generating electrical energy according to claim 10, wherein a battery is charged through a charge control circuit connected to the battery and an electrical output from the fuel cell.

15. The method for generating electrical energy according to claim 14, wherein an electric heater electrically connected to the battery provides heat to the boiler.

16. A system installed in an electrically powered vehicle for producing electrical energy, the system comprising:
    a boiler containing water and capable of producing superheated steam;
    a means for delivering the steam to at least one ceramic membrane for converting the steam from the boiler into hydrogen gas;
    a means for delivering the hydrogen gas to a fuel cell;
    the fuel cell having a means for receiving the hydrogen gas and oxygen gas to generate electrical power, heat and water;

a water feedback mechanism having a means for capturing unreacted steam and returning the unreacted steam to the boiler;

a thermal feedback system having a means for capturing the heat generated by the fuel cell and delivering the heat to the boiler;

a controller having a means for maintaining operation of the system;

an electrical power storage device for storing the electrical power;

a motor operatively coupled to a drive system for the electrically powered vehicle; and a motor controller accepting power from the storage device and providing power to operate the motor.

17. The system installed in an electrically powered vehicle according to claim 16, wherein the water generated by the fuel cell is fed back to the boiler by a water feedback mechanism.

18. The system installed in an electrically powered vehicle according to claim 16, wherein the electrical power storage device is a battery.

19. The system installed in an electrically powered vehicle according to claim 16, wherein the oxygen gas received by the fuel cell is produced by an oxygen catalytic converter receiving the superheated steam commingled with unreacted oxygen molecules from the ceramic membrane converting the superheated steam into hydrogen gas.

20. The system installed in an electrically powered vehicle according to claim 16, wherein a hydrocarbon heater has a means for heating the boiler for maintaining a predetermined temperature for the boiler.

21. A method for decomposing water into its constituent elements of diatomic hydrogen and oxygen comprising;

providing a source of superheated steam to a catalytic cell containing a first ambipolar cermet membrane having a means to decompose the water to diatomic hydrogen;

providing a source of superheated steam to a catalytic cell containing a second ambipolar cermet membrane having a means to decompose the steam to diatomic oxygen;

arranging the catalytic cells in a cascade and recirculate configuration so that the catalytic cells for the generation of hydrogen and oxygen are disposed in series; and providing a pump to circulate the superheated steam through the hydrogen and catalytic cells in turn.

22. A method for determining the amount of steam, water or mixture of steam and water required in a boiler producing superheated steam, the method comprising;

providing an output modulation valve for distributing steam to the input of a hydrogen catalytic converter cell;

monitoring pressure input to the catalytic converter cell by a pressure sensor;

providing a controller having a means for metering an initial mass of water to the boiler; measuring a pressure reservoir in the boiler with a pressure sensor;

measuring a temperature in the boiler by a temperature sensor; and providing means in the controller for solving for the mass quantity in the system in moles so that water can be added to the boiler or returned to a water storage tank as needed to maintain a set mass quantity.

23. A method for the decomposition of water into hydrogen and oxygen comprising:

providing a boiler containing water;

providing a source of heat for the boiler from a hydrocarbon fuel;

providing a plurality of ceramic membranes for receiving superheated steam from the boiler;

providing a means for delivering the hydrogen and oxygen from an output of the ceramic membranes to a fuel cell; and providing a means for delivering heat produced by the fuel cell to the boiler.

* * * * *